United States Patent
Kamijoh et al.

(10) Patent No.: US 7,046,817 B2
(45) Date of Patent: May 16, 2006

(54) IMAGE PROCESSING APPARATUS AND METHOD THEREFOR

(75) Inventors: Kohichi Kamijoh, Yokohama (JP); Norishiqe Morimoto, Tokyo (JP); Satoko Tonegawa, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 770 days.

(21) Appl. No.: 09/764,628

(22) Filed: Jan. 18, 2001

(65) Prior Publication Data

US 2001/0010729 A1    Aug. 2, 2001

(30) Foreign Application Priority Data

Jan. 21, 2000    (JP)    ............................ 2000-012520

(51) Int. Cl.
*G06K 9/00*    (2006.01)

(52) U.S. Cl. ................. 382/100; 382/232; 382/251; 713/176; 348/460; 375/243

(58) Field of Classification Search ............... 380/54, 380/210, 252, 287; 713/176; 704/200.1, 704/273, 222, 230; 381/73.1; 348/460, 348/463; 382/100, 232, 251, 252, 253; 375/240.03, 375/240.22, 243, 245

See application file for complete search history.

(56) References Cited

U.S. PATENT DOCUMENTS

| | | | | | |
|---|---|---|---|---|---|
| 5,568,570 | A | * | 10/1996 | Rabbani | ...................... 382/238 |
| 5,765,176 | A | * | 6/1998 | Bloomberg | .................. 715/514 |
| 5,930,369 | A | * | 7/1999 | Cox et al. | ...................... 380/54 |
| 6,037,984 | A | * | 3/2000 | Isnardi et al. | .......... 375/240.21 |

\* cited by examiner

*Primary Examiner*—Samir Ahmed
*Assistant Examiner*—Anand Bhatnagar
(74) *Attorney, Agent, or Firm*—Louis P. Herzberg; Anne Vachon Dougherty

(57) ABSTRACT

It is one object of the present invention to prevent embedded verification information from being lost even when a quantization process is performed after verification information has been embedded. A pre-embedding portion 32 converts a image data value so that quantized values not changing by error introduced through the embedding process. A hash value calculator 300 calculates a hash value using image data and key information, and a hash value embedding portion 302 embeds the hash value in the image data. An output format converter 304 quantizes the image data in which the hash value is embedded, and generates JPEG data.

24 Claims, 19 Drawing Sheets

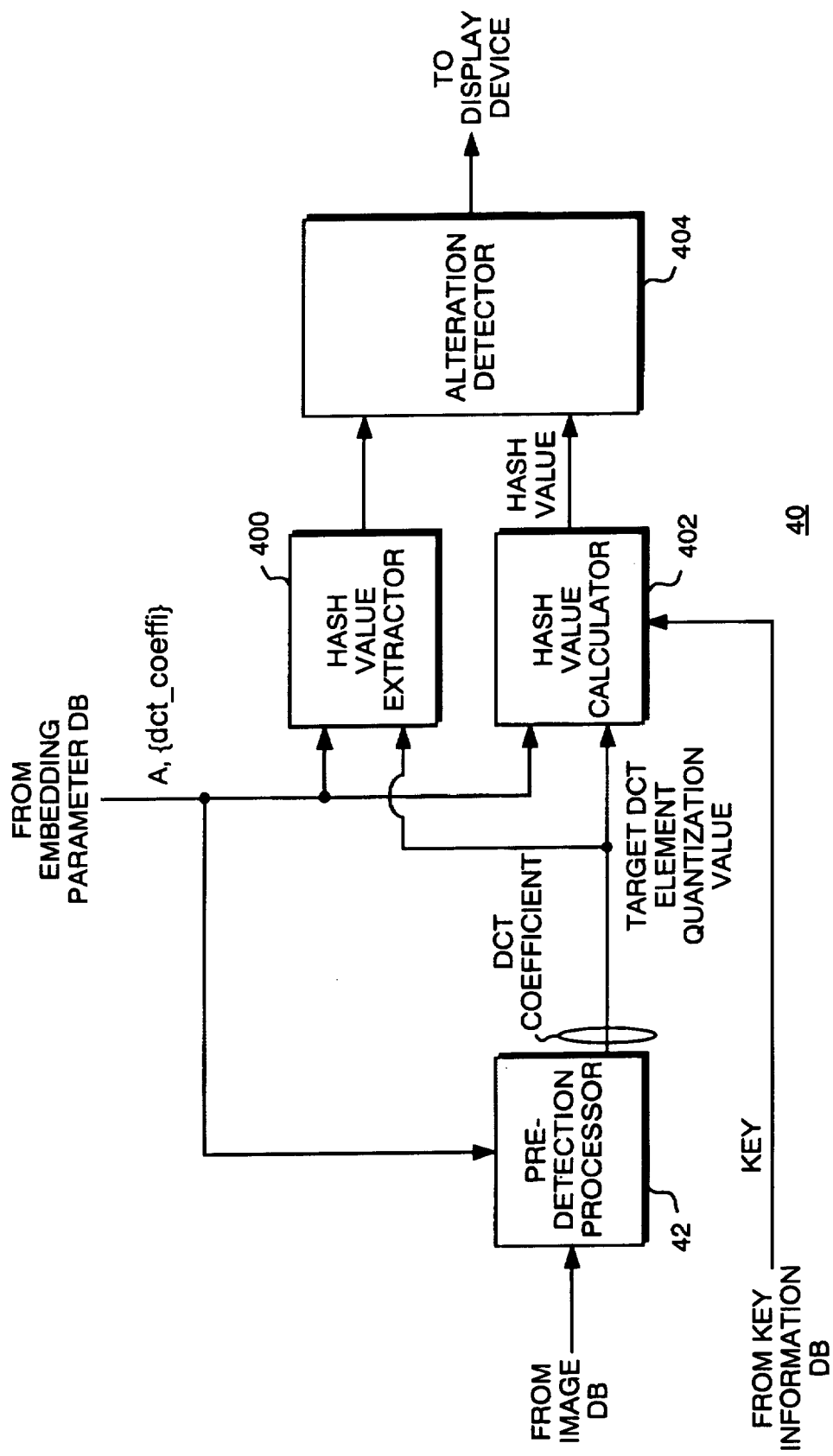

IMAGE PROCESSING APPARATUS AND METHOD THEREFOR

FIELD OF THE INVENTION

The present invention relates to an image processing apparatus and method that does not lose verification information, such as copyright information, embedded in image data, even when the image data are quantized for compression.

BACKGROUND OF THE INVENTION

Disclosed, for example, in International Publication No. WO 97/49235 (reference 1) is a method for employing pixel block coding (PBC) to embed copyright information (hereinafter referred to generally as verification information or embedded data) in data, such as image data, so that the embedded data are not visible (hereinafter this method for embedding verification information in the data contents so that the data can not be seen is referred to as an "electronic watermarking method").

Disclosed in International Publication No. WO 98/116928 (reference 2) is a method for employing the electronic watermarking method of reference 1 to inhibit the alteration of image data and to effectively protect a literary work.

Further, disclosed in Japanese Unexamined Patent Publication No. Hei 10-164549 (reference 3), as an improvement to the electronic watermarking method presented in reference 1, is a process for invisibly embedding verification information in image data so that alteration of the data can be detected.

In addition to these references, inventions relating to the electronic watermarking method are disclosed in Japanese Unexamined Patent Publication Nos. Hei 09-151747, Hei 10-83310, Hei 10-106149, Hei 10-161933, Hei 10-164349, Hei 10-285562, Hei 10-334272, Hei 10-240626, and Hei 10-240129 (references 4 to 12).

However, the methods disclosed in these references do not take into consideration the compression and coding of image data in which verification information has been embedded. That is, if the verification information embedded using these methods is smaller than a specific quantization value, the embedded data may be lost when quantization is performed.

It is, therefore, one object of the present invention to provide an image processing apparatus and a method therefor that are appropriate for compression coding.

Specifically, it is the object of the present invention to provide an image processing apparatus and method that does not lose embedded verification information, even when a quantization process is performed for image data after the embedding of verification information has been performed.

SUMMARY OF THE INVENTION

The foregoing and other objects are realized by the present invention comprising an image processing apparatus and method comprising: conversion means for altering values of image data so that quantized values are not changed by errors introduced through a predetermined process; processing means for performing the predetermined process for the image data; and quantization means for quantizing the image data for which the predetermined process being performed.

Preferably, the processing means divides the image data to perform an embedding process which embeds embedding data into each of a plurality of divided image data and the image processing apparatus additionally comprises detection means for detecting the data being embedded in the divided image data.

Preferably, the conversion means includes: format conversion means for changing the form of each pixel included in the image data, and adjustment means for, based on a quantization value used for the quantization, adjusting the value of the image data whose form has been changed. The form changing process and the adjustment process are repeated until, for each set of the image data whose form has been changed, quantized values are not changed by errors that are introduced through the predetermined process.

Preferably, the processing means performs, as the predetermined process, a process for embedding data in the image data. Preferably, the processing means includes: a hash value calculation means, for calculating a hash value based on predetermined key information and the image data; and embedding means, for embedding the hash value in the image data.

Preferably, the image processing apparatus further comprises: detection means, for detecting the data that are embedded in the image data.

Preferably, the image processing apparatus further comprises: inverse quantization means, for inversely quantizing image data; extraction means, for extracting a hash value that is embedded in the inversely quantized image data; calculation means, for calculating a hash value based on the image data and the key information that are used for the calculation of the hash value that is extracted; alteration detection means, for employing the hash value that is extracted and the hash value that is calculated to determine whether the inversely quantized image data have been altered.

Further, to achieve the above object, an image processing method according to the present invention comprises the steps of: altering the values of image data so that quantized values will not be changed by errors that are introduced through a predetermined process; performing the predetermined process for the image data; and quantizing the image data for which the predetermined process being performed.

Furthermore, to achieve the above object, according to the present invention, a storage medium is provided in which a program is stored that enables a computer to perform: a conversion step, for altering the values of image data so that quantized values will not be changed by errors that are introduced through a predetermined process; a processing step, for performing the predetermined process for the image data; and a quantization step, for quantizing the image data for which the predetermined process being performed.

BRIEF DESCRIPTION OF THE DRAWINGS

The invention will now be described in greater detail with specific reference to the appended figures wherein:

FIG. 7 is a diagram showing the arrangement of a detector in FIG. 2;

DETAILED DESCRIPTION OF THE INVENTION

A first embodiment of the present invention will now be described.

Image Processing Apparatus 1

Figure 1:
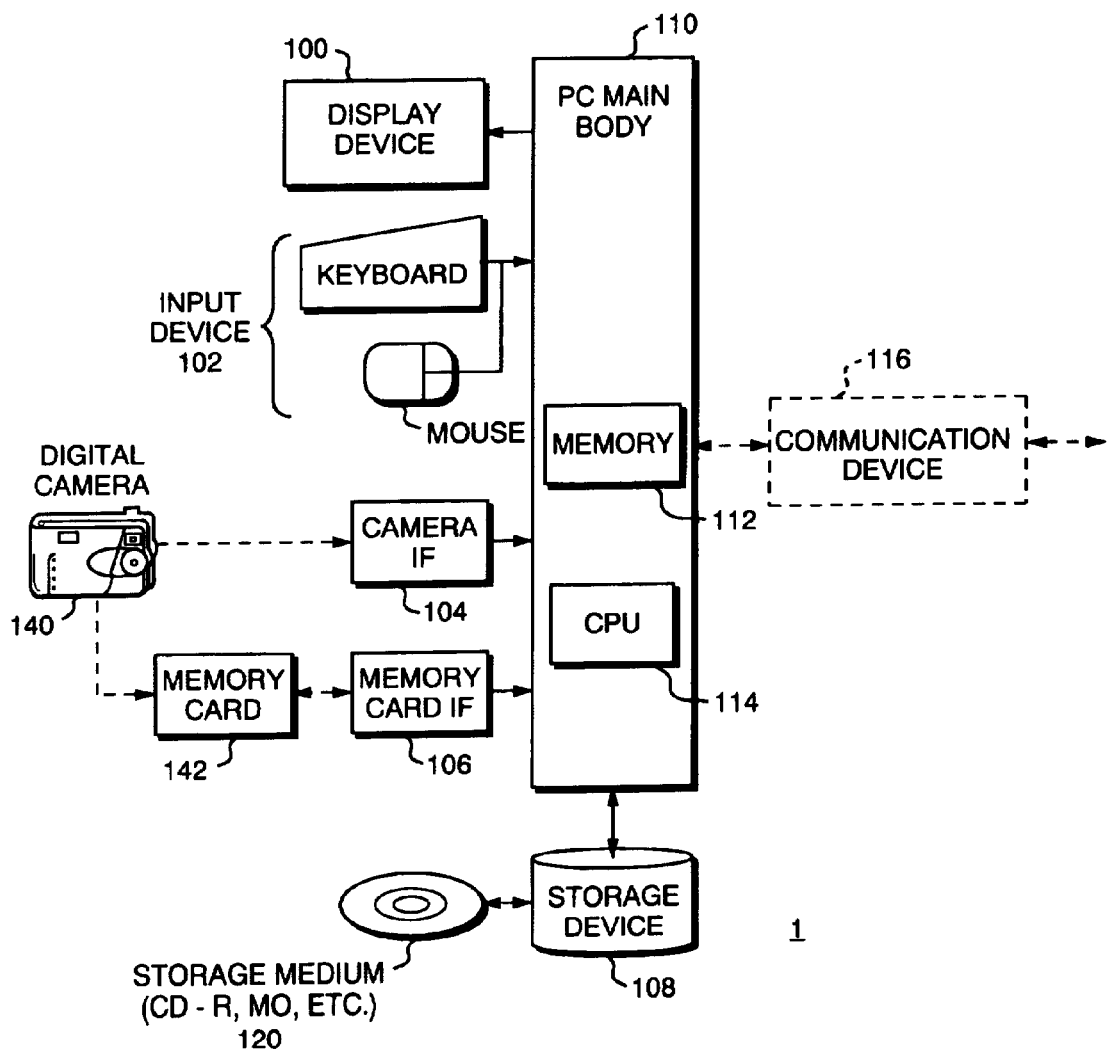
FIG. 1 is a diagram illustrating the arrangement of an image processing apparatus that applies and employs an image processing method according to the present invention.

FIG. 1 is a diagram illustrating the arrangement of an image processing apparatus 1 that performs an image processing method in accordance with the present invention. As is shown in FIG. 1, the image processing apparatus 1 comprises: a display device 100, such as a CRT display device or a liquid crystal display device; an input device 102, including a keyboard and a mouse; a digital camera interface IF (camera IF) 104; a memory card interface (memory card IF) 106; a storage device 108, such as a magneto-optical (MO) disk or a compact disk (CD) drive; and a computer main body (PC main body) 110, including a memory 112 and a microprocessor (CPU) 114. A communication device 116 is additionally included as needed. That is, the image processing apparatus 1 is so designed that the camera IF 104 and the memory card 106 are additionally provided for a common computer.

The thus arranged image processing apparatus 1 receives image data (in any form, such as JPEG, BMP or YUV) acquired by the digital camera 140, either directly, via the camera IF 104, or, via the memory card IF 106, from a memory card 142 on which the data was recorded by the digital camera 140.

The image processing apparatus 1 loads into the memory 112 an embedding/detection program 2 (which will be described later while referring to FIG. 2) that is recorded on a storage medium 120, such as a magneto-optical (MO) disk or a compact disk (CD), and that is transmitted to the storage device 108. In addition, the image processing apparatus 1 executes the embedding/detection program 2 to embed an electronic watermark (data) in the received image data, so that even when a quantization process is performed the watermark data are not lost.

The image processing apparatus 1 executes the embedding/detection program 2 to detect the electronic watermark embedded in the image data, and determines whether the image data have been altered.

Embedding/Detection Program 2

Figure 2:
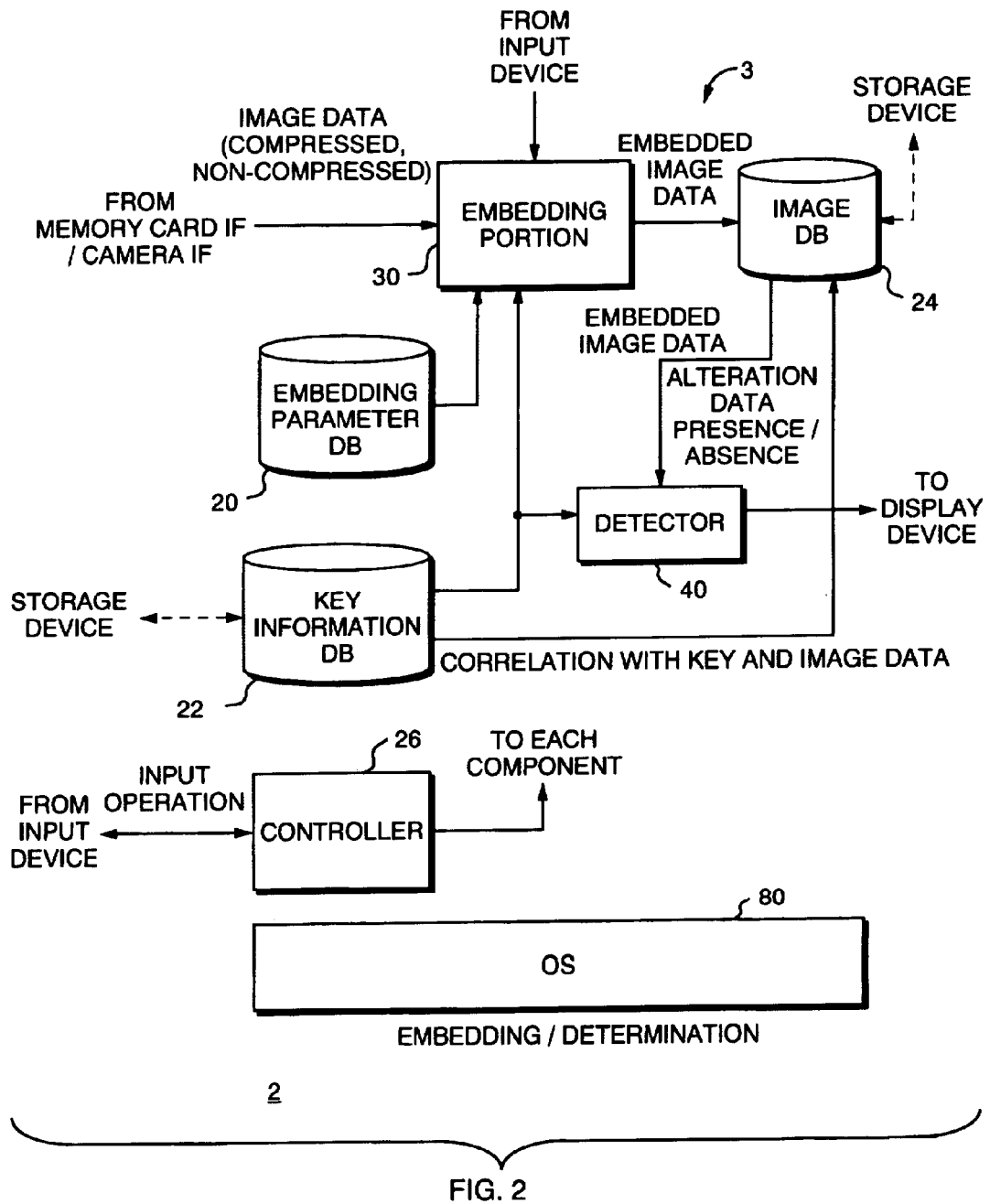
FIG. 2 is a diagram showing the structure of an embedding/detection program that is executed by the image processing apparatus in FIG. 1 to apply and employ the image processing method of the invention.

First, the arrangement and the operation of the embedding/detection program 2 will be described. FIG. 2 is a diagram showing the arrangement of the embedding/detection program 2, which is executed by the image processing apparatus 1 in FIG. 1, for applying and using the image processing method of this invention. As is shown in FIG. 2, the embedding/detection program 2 includes an OS 80, an embedding/extraction unit 3, a key information database (DB) 22, and an image database (DB) 24. The embedding/extraction unit 3 includes an embedding parameter DB 20, a controller 26, an embedding portion 30, and an extractor 40.

Os 80

An OS 80 is operating system software, such as OS/2 (IBM) or Windows (Microsoft Corp.), that provides control for the individual components of the embedding/detection program 2.

Controller 26

The controller 26 of the embedding/extractor 3 displays a GUI image (not shown) on the display device 100, and receives an instruction from a user for the displayed GUI image and transmits the data received for the instruction to the individual sections of the embedding/detection program 2. Furthermore, in accordance with the instruction received from the user, the controller 26 provides control for the operations of the individual sections of the embedding/ detection program 2.

Image DB 24

The image DB 24 is used to ensure that compressed image data (JPEG data), in which the embedding portion 30 has embedded an electronic watermark, are stored and managed either on the storage medium 120, which is inserted into the storage device 108, or on the memory card 142, which is inserted into the memory card IF 106, and that these image data are read and output to the extractor 40.

Key Information DB 22

The key information DB 22 is used to store and manage, in the storage device 108, key information that correlates the JPEG data stored in the image DB 22 with a key (e.g., a numerical value of 64 bits) that is used to generate a random number when an electronic watermark is to be embedded in the JPEG data, and to read and output the key information to the embedding portion 30 and the extractor 40.

Embedding Parameter DB 20

The embedding parameter DB 20 is used for storing and managing a parameter that is used for embedding an electronic watermark, and for outputting the parameter to the embedding portion 30.

Embedding Portion 30

Figure 3:
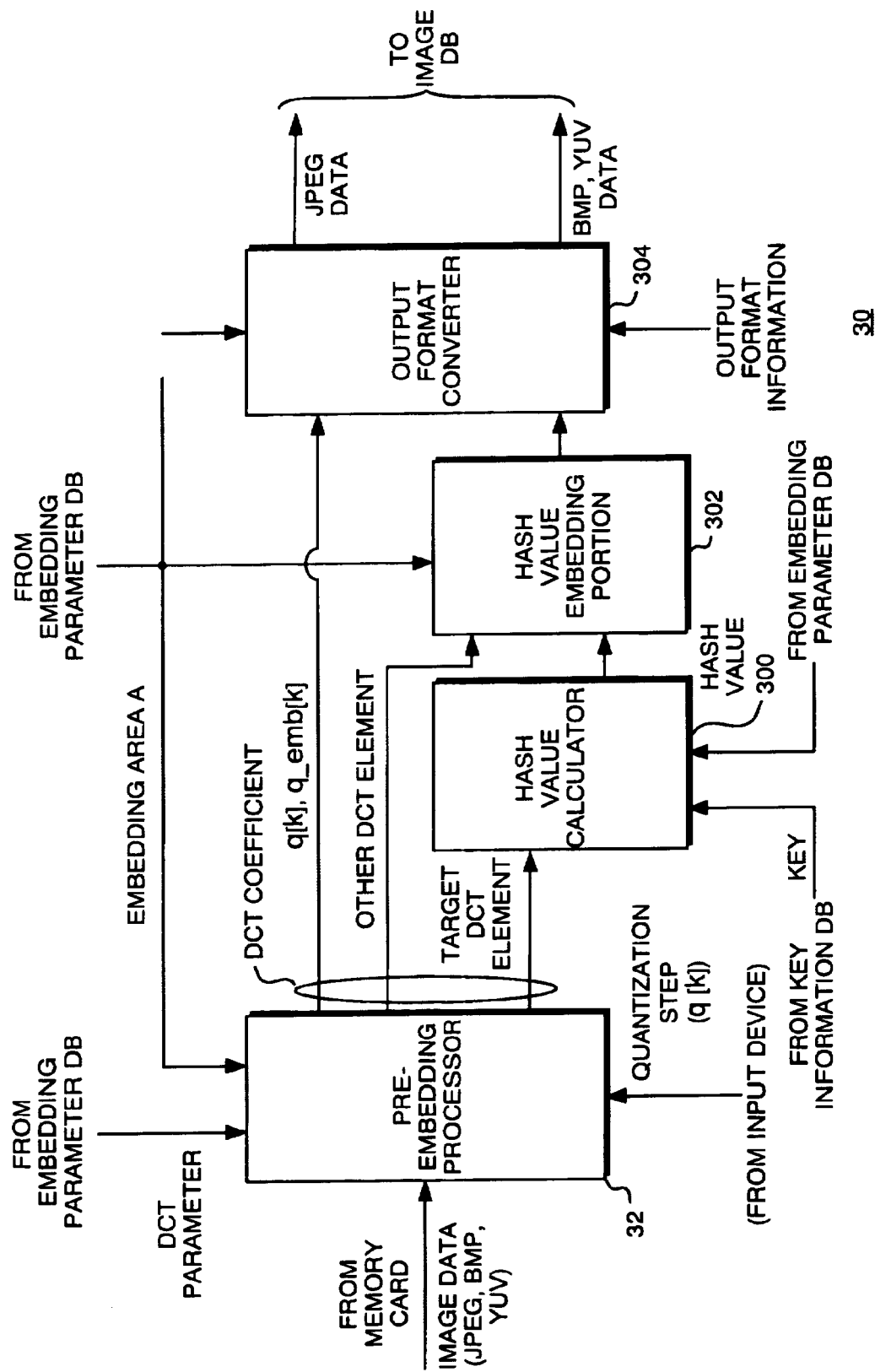
FIG. 3 is a diagram showing the arrangement of an embedding unit in FIG. 2.
Figure 4:
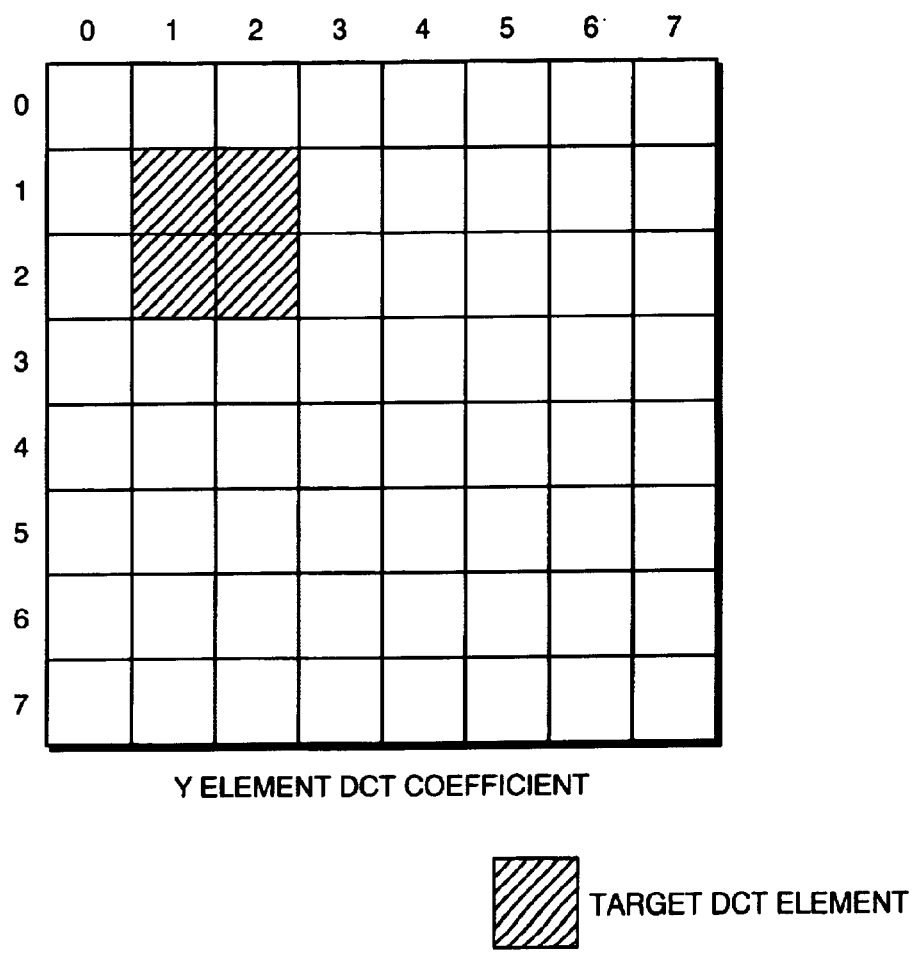
FIG. 4 is a diagram showing a target DCT coefficient.

FIG. 3 is a diagram showing the arrangement of the embedding portion 30 in FIG. 2. FIG. 4 is a diagram showing a target DCT coefficient. As is shown in FIG. 3, the embedding portion 30 includes a pre-embedding processor 32, a hash value calculator 300, a hash value embedding portion 302, and an output format converter 304. With this arrangement, the embedding portion 30 employs a hash function and a key, which are defined in advance, to calculate the hash value of a target DCT coefficient (FIG. 4) using image data having various forms (JPEG, RGB, a bit map (BMP), luminance and color differences (YUV), etc.).

In addition, the embedding portion 30 adds the obtained hash value to the image data using an electronic watermarking method, or using a method for embedding a hash value in the header of the image data.

The embedding Portion 30, by using the electronic watermarking method, can embed the hash value in DCT coefficients that are obtained using Y, U and V image data elements, or it can embed the hash value in DCT coefficients that are obtained using Y, Cr and Cb elements. In this embodiment, however, to make the explanation easier to understand, the embedding portion 30 embeds the hash value in the DCT coefficients that are obtained using Y, U and V image data elements.

Pre-embedding Processor 32

Figure 5:
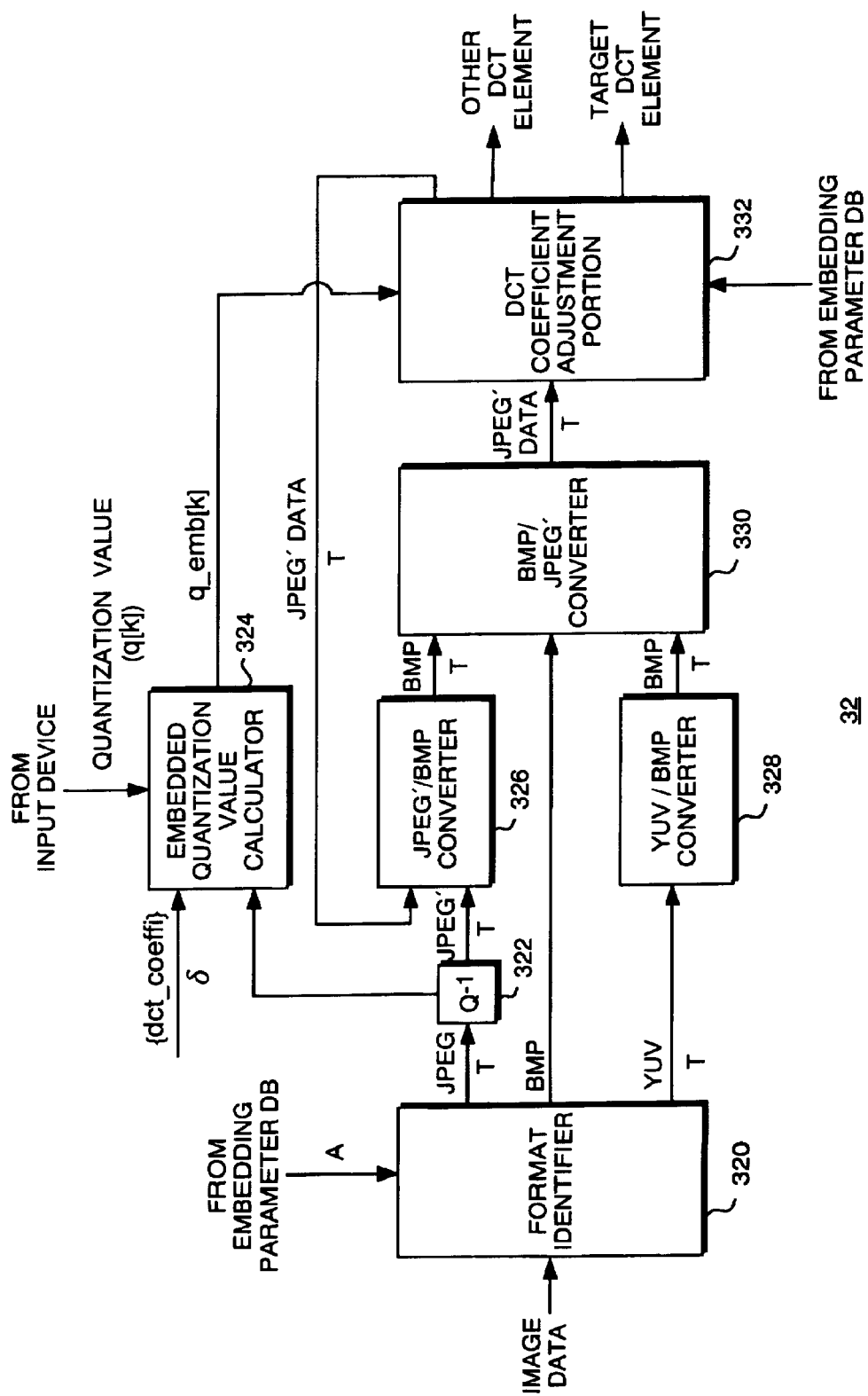
FIG. 5 is a diagram illustrating the arrangement of a pre-embedding processor in FIG. 3.

FIG. 5 is a diagram illustrating the arrangement of the pre-embedding processor 32 in FIG. 3. As is shown in FIG. 5, the pre-embedding processor 32 of the embedding parameter DB 20 (FIG. 2) includes a format identifier 320, an inverse quantizer ($Q^{-1}$) (decoder) 322, an embedded quantization value calculator 324, a JPEG'/BMP converter 326, a YUV/BMP converter 328, a BMP/JPEG' converter 330, and a DCT coefficient adjustment portion 332.

The thus arranged embedding portion 30 performs a DCT transformation and embeds a hash value as an electronic watermark, and also performs the pre-embedding process for the image data (BMP data). Thus, the embedded hash value is not lost (it is stable), even when the image data are compressed and encoded to obtain compressed JPEG image data.

Format Identifier 320

In the pre-embedding processor 32, the format identifier 320 examines the format of received image data (JPEG data, BMP data, YUV image data, etc.) to determine the form of the image data. When JPEG data are received, the format identifier 320 outputs the JPEG data to the decoder 322. When BMP data are received, the format identifier 320 outputs the BMP data to the BMP/JPEG' converter 330. And when YUV data are received, the format identifier 320 outputs the YUV data to the YUV/BMP converter 328.

In addition, the format identifier 320 receives area designation data A, which employ a MCU unit of 16×16 pixels to designate an BMP data area in which a hash value is to be embedded, and prepares a MCU table T (T [X] [Y], e.g., X=45 and Y=30 when BMP data include 720×480 pixels), which indicates whether or not the DCT coefficients that are included in the individual MCUs of the area designation data A are stable.

The area designated by the area designation data A is not a conversion target for the JPEG'/BMP converter 326 and the YUV/BMP converter 328. It is more preferable that the area designation data A designate an area at the end of the screen, since in this way any adverse affect on the image quality can be minimized.

The format identifier 320 outputs the MCU table T, along with the JPEG data, the BMP data and the YUV data, to the decoder 322, the BMP/JPEG' converter 330 and the YUV/BMP converter 328.

As is described above, the MCU table T is represented, for example, by a 450×30 matrix, and each element T[X] [Y] of the MCU table T either has a value of 1 when the DCT coefficient data of a corresponding MCU is stable, or has a value of 0 when the DCT coefficient data is not stable.

As is shown in equation 1, in the MCU table T, which corresponds to an MCU indicated by the area designation data A, the format identifier 320 defines as 1 the initial value of element T [X] [Y], and defines as 0 the other elements T[X] [Y] in the table.

Equation 1

$$T[X][Y] = 1 : (X, Y) \in A \quad (1)$$
$$= 0 : \text{other than}(X, Y) \in A$$

Decoder 322

Since JPEG data are generated by performing quantization or Huffmann coding for the DCT coefficient, first, the decoder 322 performs Huffmann decoding for the JPEG data that are received from the format identifier 320. Thereafter, the decoder 322 calculates quantization values q[k], using the Y, U and V elements of the decoded JPEG data, and outputs the quantization values q[k] to the embedded quantization value calculator 324.

The decoder 322 also employs the quantization values q[k] to perform inverse quantization for the Y, U and V elements of the decoded JPEG data, and generates DCT JPEG' coefficients using the Y, U and V elements, and while correlating the DCT coefficients with the MCU table T, outputs them to the JPEG'/BMP converter 326.

YUV/BMP Converter 328

The YUV/BMP converter 328 uses equation 2 to convert YUV data into BMP (RGB) data, and while correlating the BMP data with the MCU table T, outputs them to the BMP/JPEG' converter 330. The YUV data are converted to BMP data by the YUV/BMP converter 328 because even when an overflow or an underflow occurs at a R, G or B element of the BMP data that are obtained by the conversion of YUV data, since it did not occur at a Y, U or V element of the YUV data, a stable DCT coefficient can be obtained ($0 \leq Y \leq 256, -128 \leq U, V < 128$).

Equation 2

$$R = (int)(Y + V * 1.4020) \quad (2)$$
$$G = (int)(Y - U * 0.3441 - V * 0.7139)$$
$$B = (int)(Y + U * 1.7718 - V * 0.0012)$$

It should be noted that $$R = R > 255 \ ? \ 255 : R < 0 \ ? \ 0 : R$$
$$G = G > 255 \ ? \ 255 : G < 0 \ ? \ 0 : G$$
$$B = B > 255 \ ? \ 255 : B < 0 \ ? \ 0 : B$$

wherein A=B ?C:D is the same as C code, and
A=C (if B is TRUE)
A=D (if B is NOT TRUE)
JPEG'/BMP Converter 326

Using the DCT coefficients received by JPEG' from the decoder 322 and the DCT coefficient adjustment portion 332, the JPEG'/BMP converter 326 performs an inverse DCT (iDCT) transformation for the DCT coefficients for the Y, U and V elements of an MCU in an area other than the one designated by the area designation data A. The JPEG'/BMP converter 326, as well as the YUV/BMP converter 328, employ equation 2 to convert into BMP data the Y, U and V elements that are selected by performing the iDCT transformation, and while correlating the BMP data with the MCU table T, outputs them to the BMP/JPEG' converter 330.

BMP/JPEG' Converter 330

Of the BMP data that are received from the JPEG'/BMP converter 326, the format identifier 320 or the YUV/BMP converter 328, the BMP/JPEG' converter 330 employs equation 3 to convert, into Y, U and V elements, R, G and B BMP data elements that are included in the MCU and that correspond to an element T[X] [Y]=0 in the MCU table T, which is also received. Further, the BMP/JPEG' converter 330 performs a DCT transformation for the obtained Y, U and V elements in each 8×8 pixel DCT block, and generates DCT JPEG' coefficients. In other words, for the BMP data that is received, the BMP/JPEG' converter 330 converts unstable BMP data into DCT JPEG' coefficients. The BMP/JPEG' converter 330 outputs the obtained DCT JPEG' coefficients to the DCT coefficient adjustment portion 332, while correlating the DCT JPEG' coefficients with the MCU table T.

Equation 3

$$Y = R*0.2990 + G*0.5870 + B*0.1140$$
$$U = -R*0.1684 - G*0.3316 + B*0.5000 \quad (3)$$
$$V = R*0.5000 - G*0.4187 - B*0.0813$$

Embedded Quantization Value Calculator 324

The embedded quantization value calculator 324 calculates embedded quantization value q_emb[k] for DCT coefficient (target DCT coefficient) dct_Coeffi, which is indicated by the area designation data A. The processing performed by the embedded quantization value calculator 324 will now be described in detail.

The embedded quantization value calculator 324 receives the target DCT coefficient dct_coeffi and maximum decoder calculation error δ from the embedding parameter DB 20 (FIG. 2).

Target DCT Coefficient dct_coeffi

The target DCT coefficient dct_coeffi will now be described in detail. The target DCT coefficient dct_coeffi is at least one of the DCT coefficients that are included in an 8×8 pixel DCT block that is used for embedding an electronic watermark, and may be one for a Y, U or V element. To simplify the following explanation, however, the direct-current element dct_coeffi (0, 0) in the DCT coefficient for the Y element is employed as the target DCT coefficient dct_coeffi, and (1, 1), (1, 2), (2, 1) and (2, 2), in the DCT coefficient for the Y element, are employed to embed a hash value.

Maximum Decoder Calculation Error δ

The maximum decoder calculation error δ will now be described in detail. When a different decoder is employed to expand and decode JPEG data in which a hash value has been embedded, an error may occur in the results obtained by a system when using the iDCT process. The maximum decoder calculation error δ is set equal to a value two times that of an error that will occur during the iDCT process when a difference is encountered in an embedded quantization value system (decoder).

An error encountered during the iDCT process is in most cases equal to or smaller than 2. Therefore, a value of at least four is satisfactory as the setup value for the maximum decoder calculation error δ. In the following explanation, the maximum decoder calculation error δ is set to 12, which is satisfactorily large.

The embedded quantization value calculator 324 performs the following process by using a quantization value q[k] that is received from the decoder 322 when the JPEG data are received by the pre-embedding processor 32, or by using a quantization value q[k] that is entered by a user, via the input device 102, when the received image data are not JPEG data.

If the image data received by the pre-embedding processor 32 are not JPEG data and if the quantization value q[k] is not entered via the input device 102, the embedded quantization value calculator 324 sets the values of all the elements of the quantization value q[k] equal to the maximum decoder calculation error δ (q[k]=δ).

Following this, the embedded quantization value calculator 324 employs equation 4 to calculate an embedded quantization value q_emb[k] (k({dct_coeffi})) that corresponds to each target DCT coefficient dct_coeffi that is indicated by the area designation data A. The embedded quantization value q_emb[k] is used to quantize a DCT coefficient in which a hash value is embedded, and is a value that is equal to integer times the quantization value q[k].

Equation 4

$$q\_emp[k]=(int((\delta-1)/q[k]+1)*q[k]tm \quad (4)$$

When the quantization value q[k] is greater than the maximum decoder calculation error δ (q[k]≧δ), the embedded quantization value q_emb[k] matches the quantization value q[k] (q_emb[k] q[k]). When the JPEG data are received by the pre-embedding processor 32, the quantization value q[k] need not be changed.

DCT Coefficient Adjustment Portion 332

The DCT coefficient adjustment portion 332 controls the process for a loop formed by the JPEG'/BMP converter 326, the BMP/JPEG' converter 330 and the DCT coefficient adjustment portion 332. While the process iterates through the loop a predetermined number of times (e.g., five times), the DCT coefficient adjustment portion 332 adjusts the value held by the target DCT coefficient dct_coeffi, which is received from the BMP/JPEG' converter 330, so that the value held by the target DCT coefficient dct_coeffi nearly equals integer times the embedded quantization value q_emb[k], i.e., so that the target DCT coefficient dct_coeffi is stabilized.

The process performed by the DCT coefficient adjustment portion 332 will be described in more detail. The DCT coefficient adjustment portion 332 receives a stabilization threshold value Δ from the embedding parameter DB 20 (FIG. 2). The stabilization threshold value Δ is used to determine whether the value of the target DCT coefficient dct_coeffi is nearly integer times the embedding quantization value q_emb[k], and its value is set so that it is smaller than the maximum decoder calculation error δ, e.g., a value of 1 (δ>Δ=1.0).

The DCT coefficient adjustment portion 332 determines whether all the DCT coefficients, which are included in individual DCT blocks in an MCU that is indicated by the area designation data A, satisfy equation 5. When all the DCT coefficients included in the target DCT blocks satisfy equation 5, the DCT coefficient adjustment portion 332 sets the values of the elements T[X] [Y] in the MCU table T that correspond to the DCT blocks to 1, which represents the stable state (T[X] [Y]=1). In all other cases, the elements T[X] [Y] are set to 0 (T[X] [Y]=0).

Equation 5

$$|c[k] - coeffi\_emb[k] * q\_emb[k]| < \Delta/2 \quad (5)$$

When the DCT coefficients of all the DCT blocks in all of the MCUs satisfy equation 5 and a stable state is established, the DCT coefficient adjustment portion 332 outputs the target DCT coefficient dct_coeffi and the other DCT coefficients to the image DB 24 (FIG. 2). If a stable state is not established, however, the DCT coefficient adjustment portion 332 adjusts and stabilizes an unstable DCT coefficient.

The DCT coefficient adjustment portion 332 outputs to the image DB 24 (FIG. 2), as the target DCT coefficient dct_coeffi indicated by the area designation data A, the embedded quantization value coeffi_emb[k]. As for the other DCT coefficients, their quantized values (coeffi[k]=c[k]/q[k]) are output to the image DB 24.

Stabilization of DCT Coefficient

The process during which the DCT coefficient adjustment portion 332 stabilizes the DCT coefficient (the stabilization process) will now be described in detail. The DCT coefficient adjustment portion 332 employs equation 6 to transform the DCT coefficient of the MCU that corresponds to an element T[X] [Y] in the MCU table T that has a value of 0.

Equation 6

$$c[k] = coeff\_emb[k] * q\_emb[k];$$
$$\quad if\ k \in \{dct\_coeffi\}$$
$$c[k] = (int)(c[k] > 0\ ?\ c[k]/q\_[k] + \alpha : c[k] < 0\ ?$$
$$c[k]/q[k] - \alpha : 0) * q[k],$$

In equation 6, $\alpha$ is a value of 0 to 0.5 ($0 \leq \alpha \leq 0.5$), and when the value of $\alpha$ is increased, in a reproduced image, changes due to the stabilization process can be reduced. However, since the absolute value of coeff[k] after transformation is always large, and nearly equals the value of the R, G or B element of the BMP data that are obtained by transforming the DCT coefficient in the stable state, overflows or underflows tend to occur in the R, G and B elements of the BMP data.

When the value of $\alpha$ is reduced, the absolute value of coeff[k] after transformation is always small, and the values of the R, G and B elements of the BMP data that are obtained by transforming the DCT coefficient in the stable state are nearly equal to 128. Thus, in this case overflows or underflows seldom occur in the values of the R, G and B elements of the BMP data.

While taking these properties into account, the DCT coefficient adjustment portion 332 reduces by one the value of $\alpha$ each time the process iterates through the loop formed by the JPEG'/BMP converter 326, the BMP/JPEG' converter 330 and the DCT coefficient adjustment portion 332, so that the effect produced on a reproduced image due to the stabilization process is minimized, and so that the occurrence of overflows or underflows in BMP data, obtained by the transformation of a stable DCT coefficient, is prevented.

For example, when the number of times the process iterates through the loop formed by the JPEG'/BMP converter 326, the BMP/JPEG' converter 330 and the DCT coefficient adjustment portion 332 is defined as the "loopcount," the DCT coefficient adjustment portion 332 reduces the value of $\alpha$ in accordance with the iteration count, as is indicated by equation 7.

Equation 7

$$\alpha = 0.5\,\text{1loopcount}/10 \quad (\text{loopcount} < 5) \quad (7)$$
$$0 \quad (\text{loopcount} \geq 5)$$

The DCT coefficient adjustment portion 332 adjusts the DCT coefficients of all the DCT blocks that are included in the MCU that correspond to the element T[X] [Y] in the MCU table that has a value of 0, and outputs the obtained DCT coefficients to the JPEG'/BMP converter 326.

Although it very seldom occurs, an overflow or an underflow may occur in the process performed by the JPEG'/BMP converter 326, and even when the process iterates through the loop by five times, a DCT coefficient that does not satisfy equation 5 may be present. To cope with this, after the process has iterated through the loop five times, the DCT coefficient adjustment portion 332 continues the iterations until the DCT coefficient value satisfies equation 5. In addition, each additional time the process iterates through the loop, the DCT coefficient adjustment portion 332 decrements the absolute value of coeff_emb[k] by one (or if a specific limitation has been established, a minimum number that is equal to or greater than 1 and that satisfies the limitation).

When additional iterations through the loop are performed, and when the absolute value of coeff_emb[k] is decremented by one (or if a specific limitation has been established, the minimum number that is equal to or greater than 1 and that satisfies the limitation) each time the loop process is repeated, the DCT coefficient adjustment portion 332 reduces the iterations through the loop process as a finite count, while suppressing changes to an image to the extent possible.

Figure 6A:
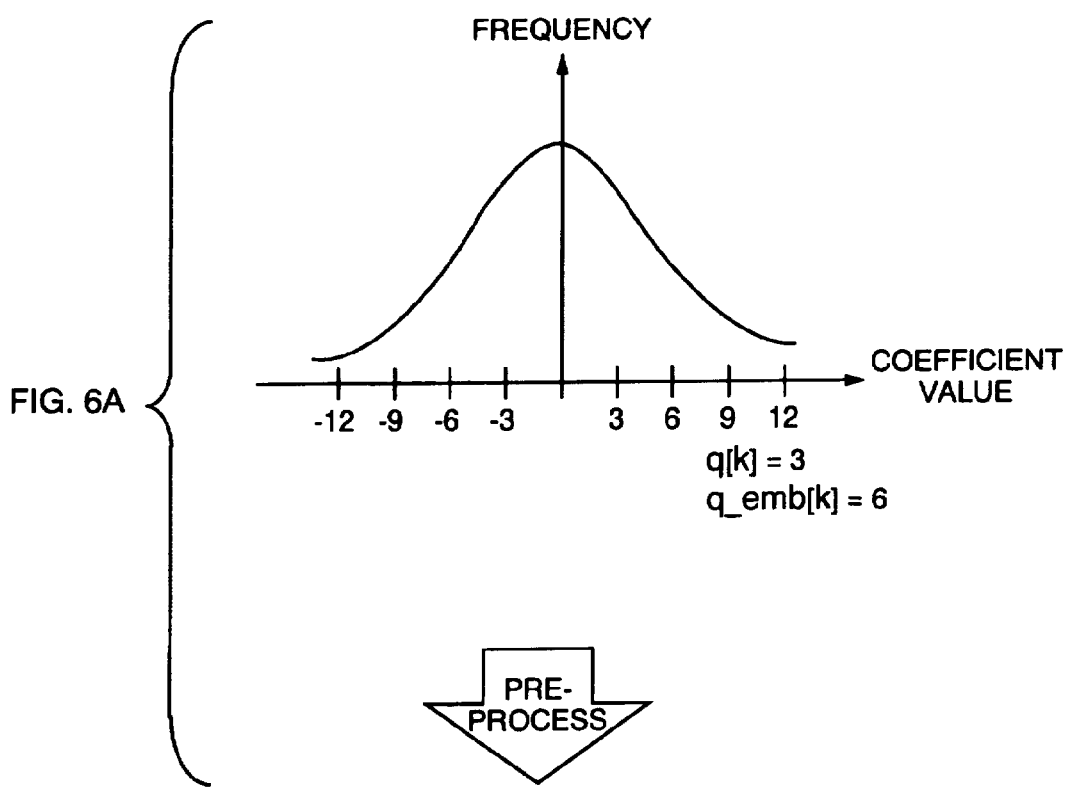
FIG. 6A is a histogram showing the frequency of the target DCT coefficient dct'_coeffi before it is stabilized by the pre-embedding processor in FIG. 3, while q[k]=3 and q_emb[k] are employed.
Figure 6B:
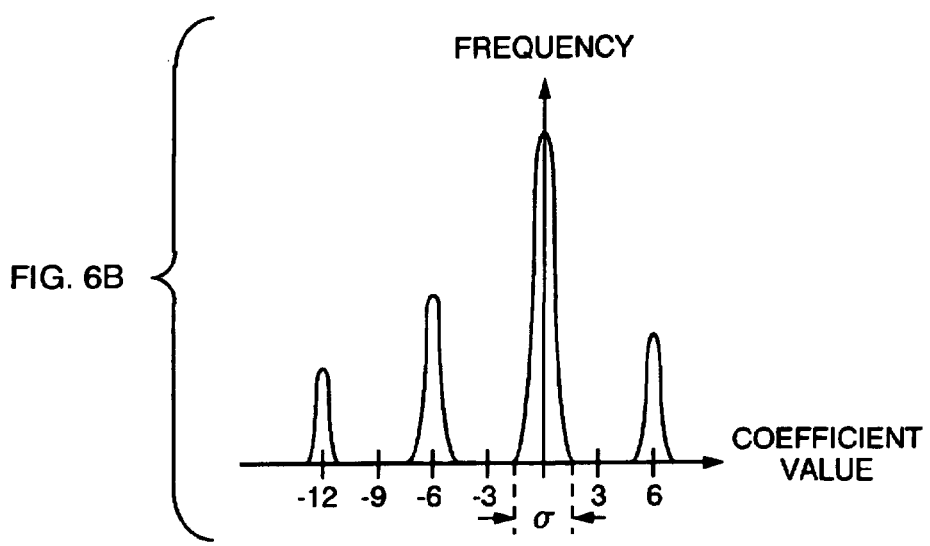
FIG. 6B is a histogram that also shows the frequency of the target DCT coefficient dct_coeffi after it is stabilized by the pre-embedding processor.

Through the above described process performed by the pre-embedding processor 32, the value of the target DCT coefficient that is distributed, as is shown in FIG. 6A, nearly equals a value integer times the embedded quantization value q_emb[k], as is shown in FIG. 6B. As a result, the target DCT coefficient value is distributed across a range of $\sigma$ ($\sigma < \delta$) at a value integer times that of the embedded quantization value q_emb[k].

Hash Value Calculator 300

An explanation will now be given by again referring to FIG. 3. Through the process performed by the pre-embedding processor 32 (FIGS. 3 and 4), all the DCT coefficients of {dec_coeffi} are stabilized so they are nearly equal to integer times the embedded quantization value q_emb[k]. That is, equation 5 is established. The problem here is whether the property represented by equation 5 can be maintained, when the JPEG data obtained from the output of the pre-embedding processor 32 are processed by a BMP encoder other than the JPEG'/BMP converter 326 (FIG. 5). For example, assume that the output data for the pre-embedding processor 32 (FIGS. 3 and 4) are defined as inpt.bmp, and the BMP data obtained by another encoder are defined as input2.bmp. A difference between these data is a calculation error in the process for performing iDCT for the JPEG data, converting the obtained data to YUV data, and further converting the YUV data to BMP data; and, due to this error, it is very probable that the data input.bmp and the data input2.bmp will exceed the quantization value, as is shown in equation 8. That is, there is little probability that the DCT coefficient c2[k] obtained from input.bmp will satisfy equation 8.

Equation 8

$$err[k] = |c2[k] - coeff\_emb[k] * q\_emb[k]| \geqq q\_emb[k]/2 \quad (8)$$

$$(\geqq \delta/2)$$

Assume that a value expressed to the second decimal place is employed in a calculation performed for a process whereby a specific BMP encoder is used to convert iDCT transformation results (iDCT data) or YUV data into BMP data, and that in the worst case the calculation error for the iDCT data is 0.05 and that addition or subtraction is repeated 64 times for one coefficient during the iDCT process. Then, in the worst case, the calculation error is 3.35 (=0.05×63+3). However, if, as is described above, the maximum error δ is set to a value greater than 12, equation 8 is not established.

In addition, for a system wherein an error equal to or greater than a value expressed to the first decimal place is generated during the iDCT calculation, the error is too large, and merely by using conversion, an image can be greatly changed, so that such a system is not practical. By examining multiple systems, err[k]=3.0 at most.

Therefore, for all {dct_coeffi}, the quantization value coeff_emb[k] obtained using all q_emb[k] can resist the process for converting JPEG data into BMP data. Thus, the hash value of coeff_emb[k] is obtained, and need only be written to the header of the JPEG data, or may be embedded as a watermark as part of the overall image data.

Except for the area A used for embedding, the key K that is obtained from the key DB, and that is commonly used by a person in charge of data embedding and by a person in charge of watermark detection, is employed to calculate a hash value DCT_hash using equation 9.

Equation 9

$$DCT\_hash = hash(K, coeff\_emb[k]) \quad (9)$$

The value hash() in equation 9 is, for example, MD5. The key K is a 64-bit key, and 64 bits is an appropriate length for DCT_hash.

Hash Value Embedding Portion 302

The Hash Value Embedding Portion 320 embeds, in image data, a DCT_hash that is obtained by the hash value calculator 300. While any algorithm for embedding may be employed, an LSB method is an appropriate method that will cause no harm to an image. The LSB method is one of the methods used for embedding an electronic watermark in digital data. Using this method, information can be embedded by changing the LSB (Least Significant Bit) of the characteristic value of the data in accordance with a specific rule. The LSB is changed because there is substantially no change in the digital data (image or sound) after the watermark has been embedded.

An explanation will now be given using a specific example. Assume that there are n elements of DCT coefficients {dct_coeffi} that are obtained from the embedding parameter DB 20 (FIG. 2) to use for embedding, and that hash_emb is 64 bits and m bits are to be embedded in one sub-block (8×8 pixels) (n≧m). That is, 64/m sub-blocks are required for embedding.

In order to minimize the deterioration of image quality due to embedding, a method has been devised for determining in advance several proposed designation areas A (e.g., the top, bottom, right end and left end on the screen), for embedding an electronic watermark in one of these locations, and for detecting all the areas. In this example, a desired bit is embedded in the LSB of {dct_coeffi}.

Equation 10

$$emb\_coeff[k] = 2p + emb\_bit[k] \quad (10)$$

where p denotes a specific integer and emb_bit[k] denotes a bit 0 or 1 to be embedded in coefficient k.

After emb_coeff[k] has been changed to establish equation 10, the DCT coefficients in the area A need only be transmitted to the JPEG'/BMP converter 326 (FIG. 5), so that the DCT coefficients for {dct_coeffi} in the area A are stabilized while equation 10 is established. In this case, so long as emb_coeff[k] is changed so that its absolute value is increased (i.e., so long as α is set equal to a small value), convergence occurs rapidly and equation 6 can be established. If equation 6 is established, the area A is in a stable state, so that the embedded bit is not changed even when the JPEG' data are converted into BMP data.

Output Format Converter 304

The output format converter 304 quantizes the output of the hash value embedding portion 302, and converts the obtained results to provide a desired output format that a user has designated via the input device 102 (FIG. 1).

When the JPEG format is designated, the DCT coefficient belonging to {dct_coeffi} is quantized, not by using q_emb[k], but by using q[k]. The quantized coeff [k] is calculated as coeff[k]=emb_coeff[k]*q_emb[k]/q[k].

Detector 40

The detector 40 (FIG. 2) will now be described. The detector 40 receives image data embedded by the embedding apparatus, calculates the hash value or the target DCT element using the key K, compares the obtained hash value with a hash value that is embedded in area A, and determines whether the image has been altered.

Pre-detection Processor 42

Figure 8:
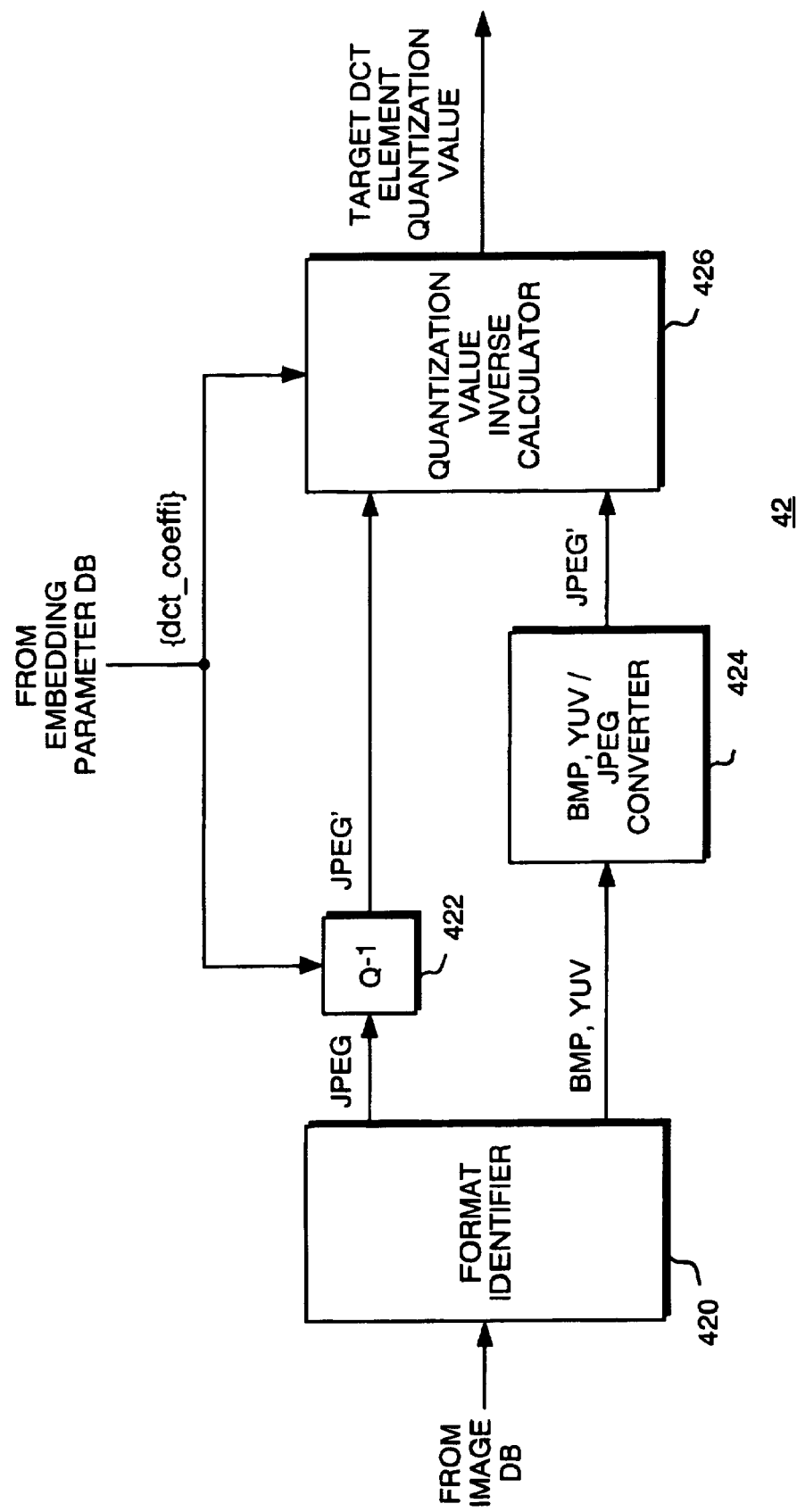
FIG. 8 is a diagram showing the arrangement of a pre-detection processor in FIG. 7.

FIG. 7 is a diagram illustrating the arrangement of the detector 40 in FIG. 2. FIG. 8 is a diagram illustrating the arrangement of a pre-detection processor 42 in FIG. 7. In the detector 40, the pre-detection processor 42 employs an input image to perform an inverse calculation for embedded quantization value q_emb[k].

Format Identifier 420

A format identifier 420 identifies the format of an input image, and when the format is the JPEG format, the image data are transmitted to a decoder 422. When the format is BMP or YUV, the image data are output to a BMP, YUV/JPEG' converter 424.

Decoder 422

The decoder 422 decodes the input image data, performs inverse quantization for the target DCT coefficient of an overall image, excluding the area A, and regards the obtained image as a JPEG' image.

BMP, YUV/JPEG' Converter 424

The BMP, YUV/JPEG' converter 424 performs a DCT transformation of received BMP or YUV data to obtain JPEG' data.

Quantization Value Inverse Calculator 426

Figure 9:
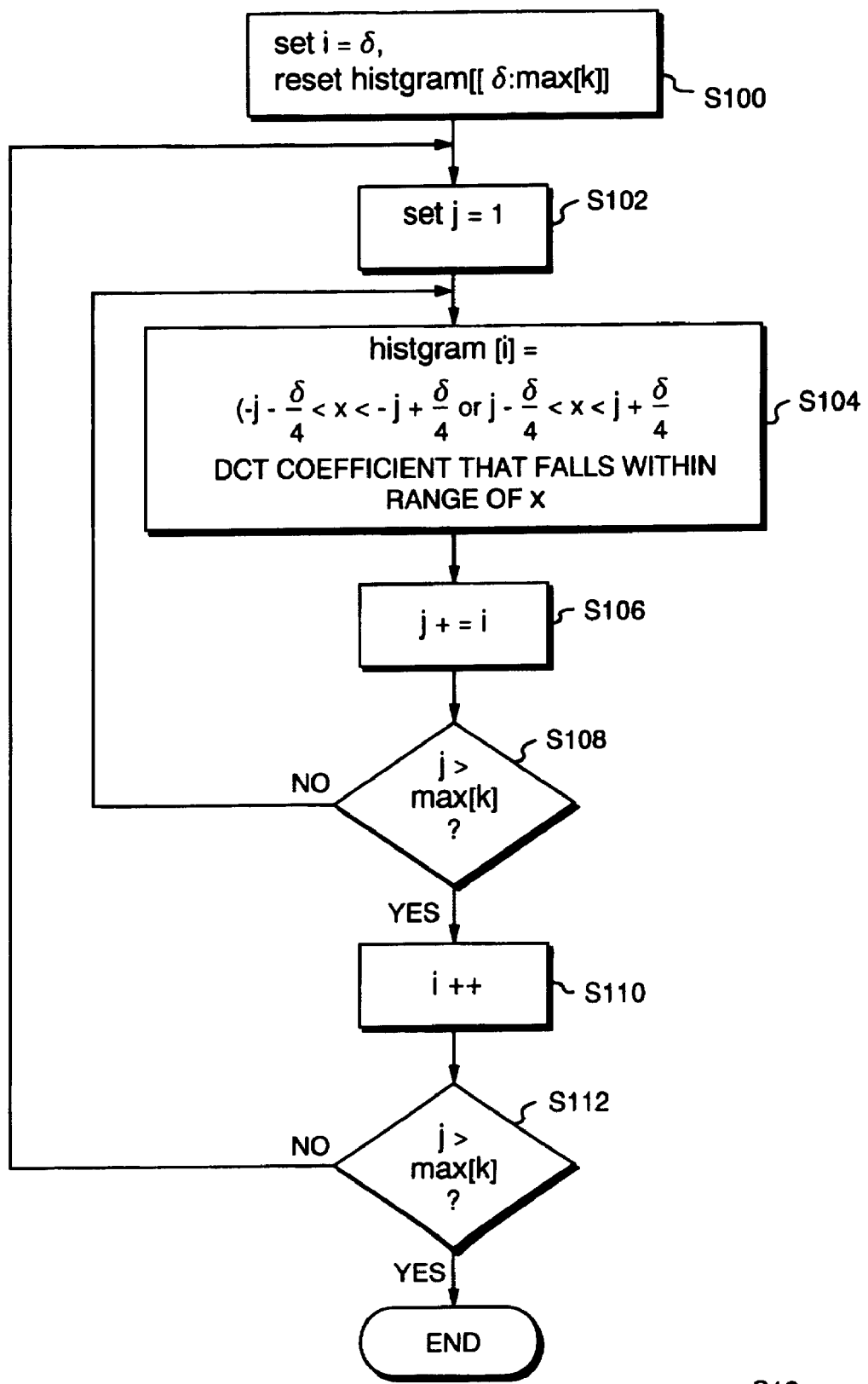
FIG. 9 is a first flowchart showing the processing performed by a quantization value inverse calculator in FIG. 8.
Figure 10:
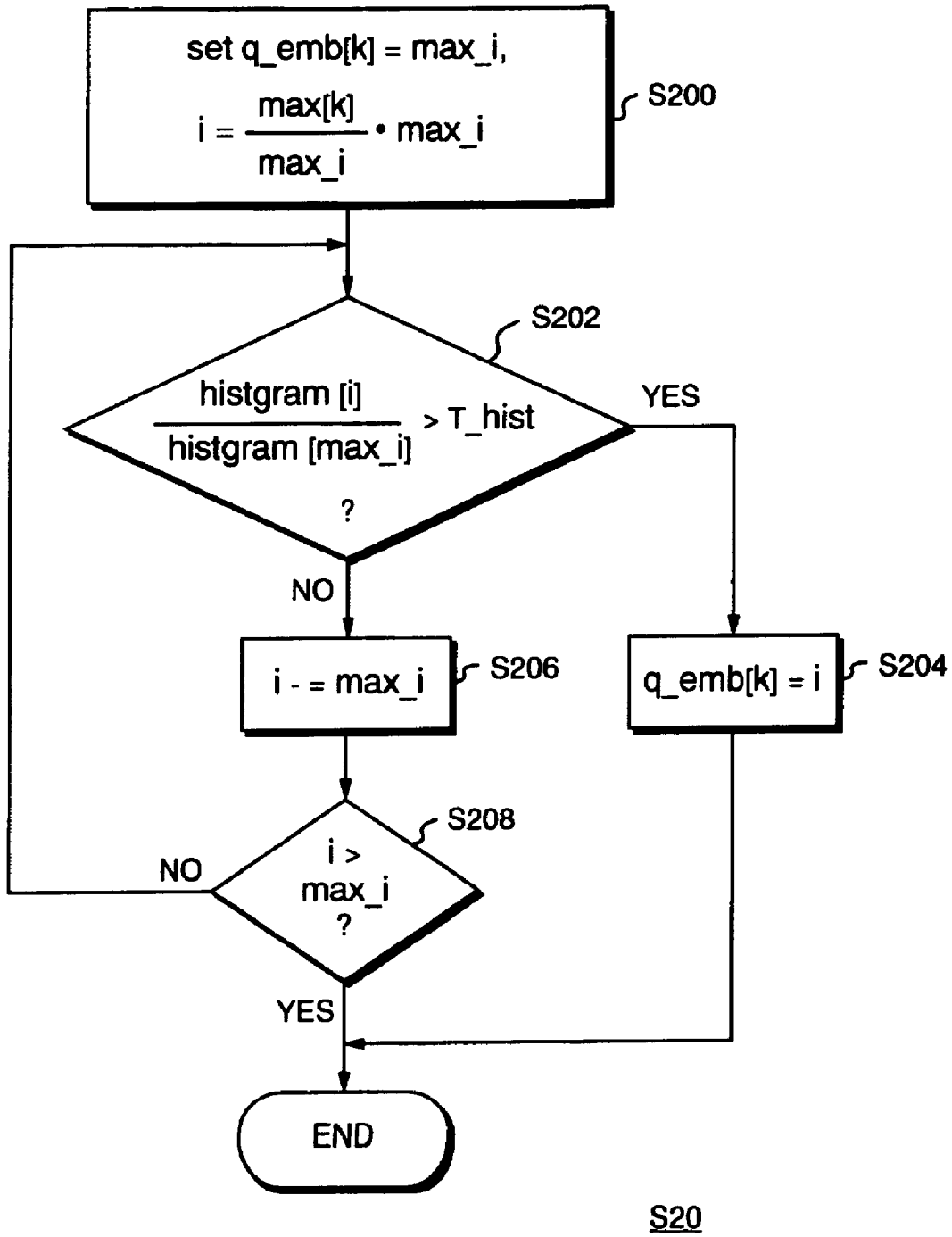
FIG. 10 is a second flowchart showing the processing performed by a quantization value inverse calculator in FIG. 8.

FIGS. 9 and 10 are a first and a second flowchart showing the embedded quantization value inverse calculation process performed by a quantization value inverse calculator 426 in FIG. 8. While max[k] is defined as the maximum absolute coefficient, for the overall image, of the target DCT elements k ∈ {dct_coeffi} that are output by the decoder 422 and the BMP, YUV/JPEG' converter 424, the quantization value inverse calculator 426 calculates max[k] using a histogram representing the number of DCT coefficients that are collected around individual assumed quantization values i.

As is shown in FIG. 9, when the format of the input data of the format identifier 420 is the JPEG format, only the histogram for i=q[k]*n (n=1, 2, . . . ) need be examined. When max_i is defined for the i that provides the maximum value for histogram [i], obtained during the process in FIG. 9, q_emb[k] is determined using the process in FIG. 10. In FIG. 10, q_emb[k] is obtained because it is a multiple of max_i in FIG. 9.

T_thre is a little smaller than 1, and a T_thre=about 0.8 is appropriate. For an exceptional image for which q_emb[k] can not be obtained through the processes in FIGS. 9 and 10, because an inappropriate value was assigned to T_thre, only a histogram wherein q_emb[k] is satisfied during the processes in FIGS. 9 and 10 need be prepared during the embedding process. For example, if many coefficients are collected around q_emb[k]*2n, an electronic watermark for q_emb[k]*2n+1 need only be embedded at a location whereat an image seems to be less deteriorated.

Hash Value Extractor 400

The hash value extractor 400 will now be described while again referring to FIG. 7. Using the following method, the hash value extractor 400 examines the LSB using the coefficient c[k] of the DCT elements {dct_coeffi}, which is read from the embedding parameter DB 20, and the embedding quantization value q_emb[k], which is obtained by the pre-detection processor 42. Then, the hash value embed_hash for which these coefficients and the quantization value are embedded is calculated.

Equation 11

$$LSB = (int)((c[k]+\beta)/q\_emb[k]) \bmod 2, \quad (11)$$

where $\beta = c[k] \geq 0 \; ? \; q\_emb[k]/2 : -q\_emb[k]/2$

Hash Value Calculator 402

For areas other than area A, the hash value calculator 402 calculates coeff_emb[k] using coefficient C[k]q_emb[k] of {dct_coeffi}, while α=0.5 in equation 6, and calculates DCT_hash using equation 9.

Alteration Detector 404

The alteration detector 404 displays, on the display device 100 (FIG. 1), a message that there has been no alteration when DCT hash=embed_hash is established between DCT_hash and embed_hash, which are obtained from the hash value extractor 400 and the hash value calculator 402, or displays a message that there has been an alteration in the other case (DCT_hash≠embed_hash).

Overall Processing

Figure 11:
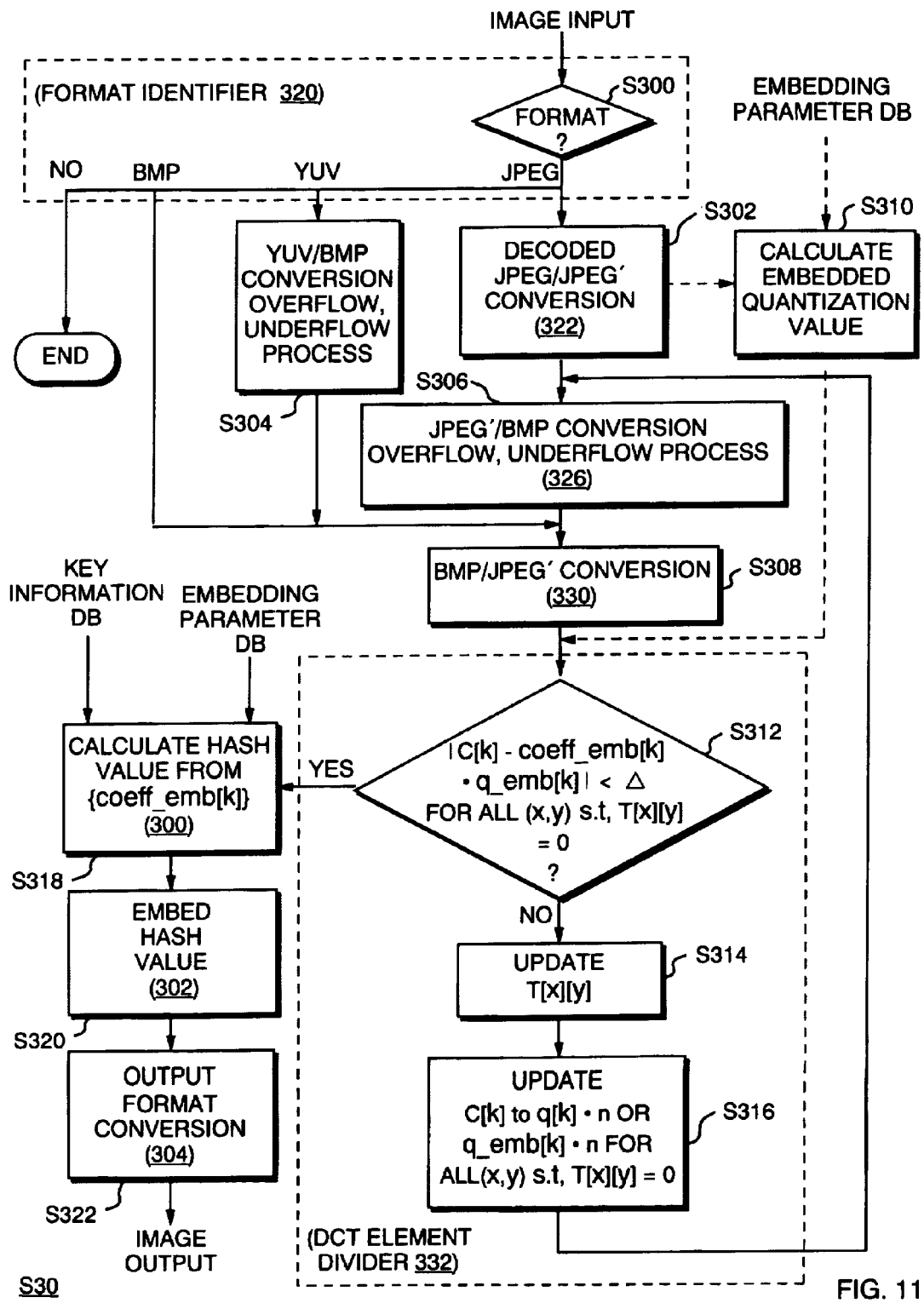
FIG. 11 is a flowchart showing the embedding processing performed by an embedding/detection program (FIG. 2)
Figure 12:
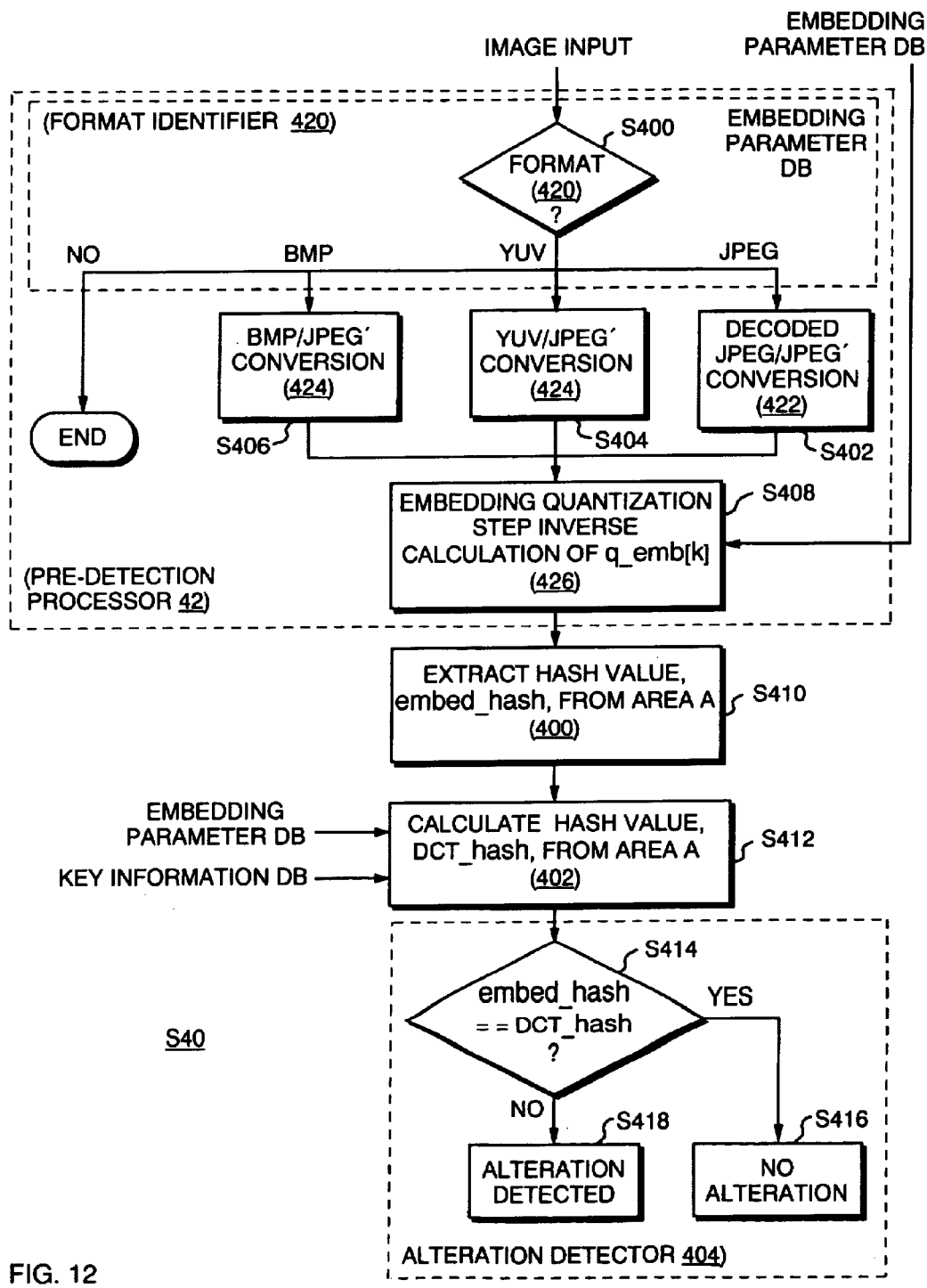
FIG. 12 is a flowchart showing the detection processing performed by the embedding/detection program (FIG. 2)

FIG. 11 is a flowchart showing the embedding processing performed by the embedding/detection program 2 (FIG. 2). FIG. 12 is a flowchart showing the detection processing performed by the embedding/detection program 2 (FIG. 2). The numbers in parentheses in processes in FIGS. 11 and 12 represent reference numerals provided for the pertinent components (FIGS. 3, 5, 7 and 8) of the embedding/detection program 2. The individual components of the embedding/detection program 2 perform the embedding processing as is shown in FIG. 11, and the detection processing as is shown in FIG. 12.

Modification

Figure 13:
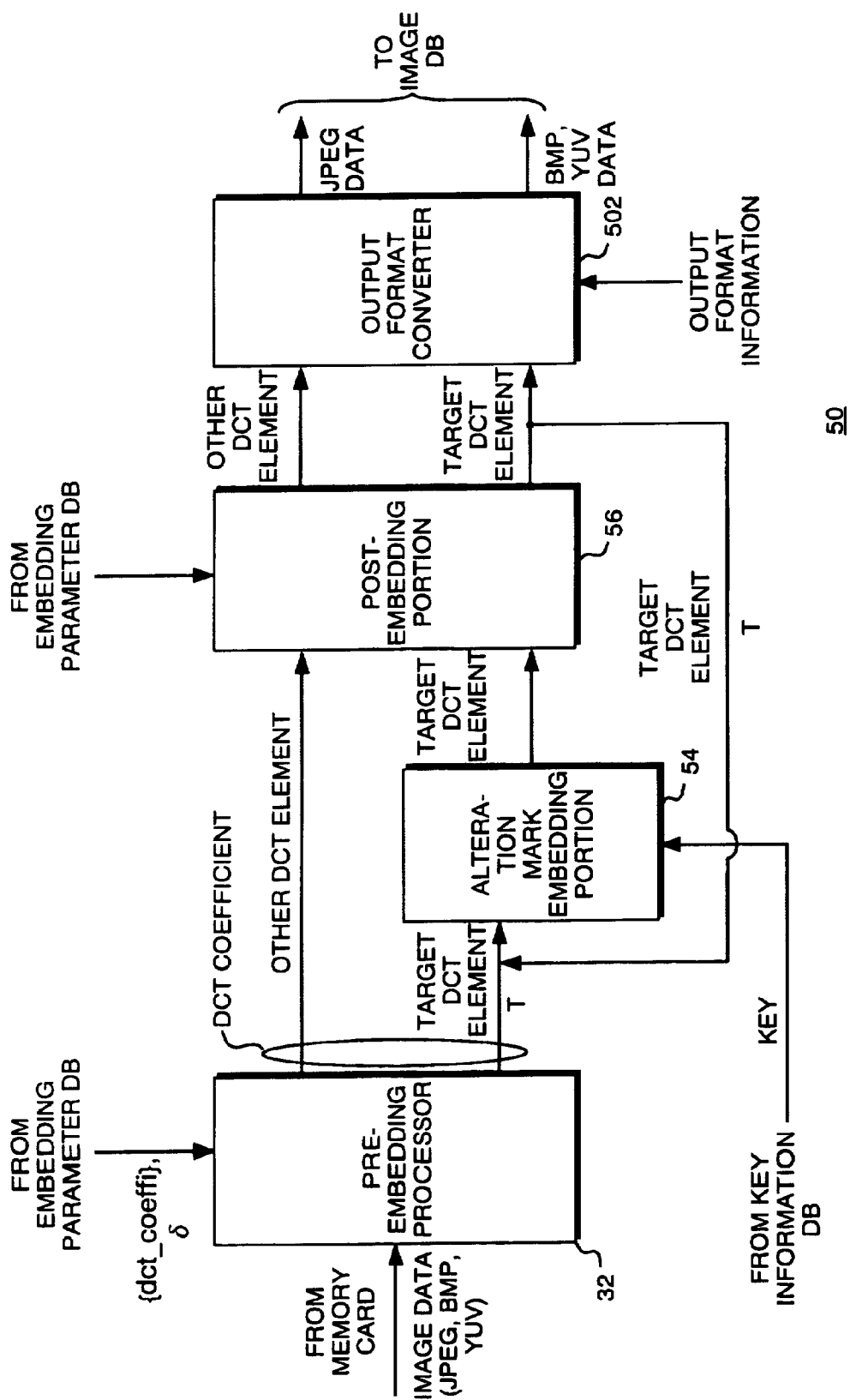
FIG. 13 is a diagram illustrating the arrangement of an embedding portion that is used by the embedding/detection program (FIG. 2) instead of the preceding embedding portion.
Figure 14:
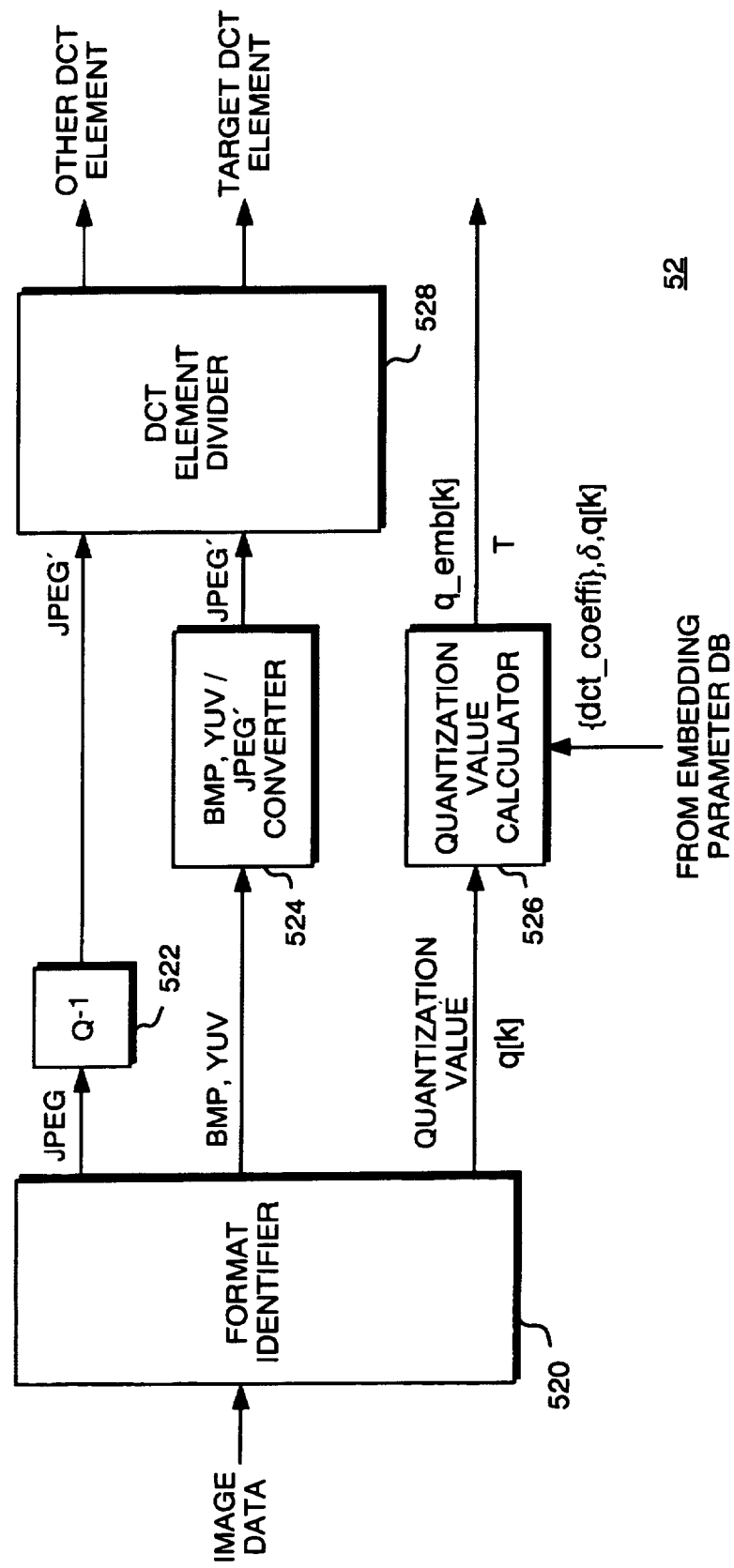
FIG. 14 is a diagram showing the arrangement of a pre-embedding processor in FIG. 13.
Figure 15:
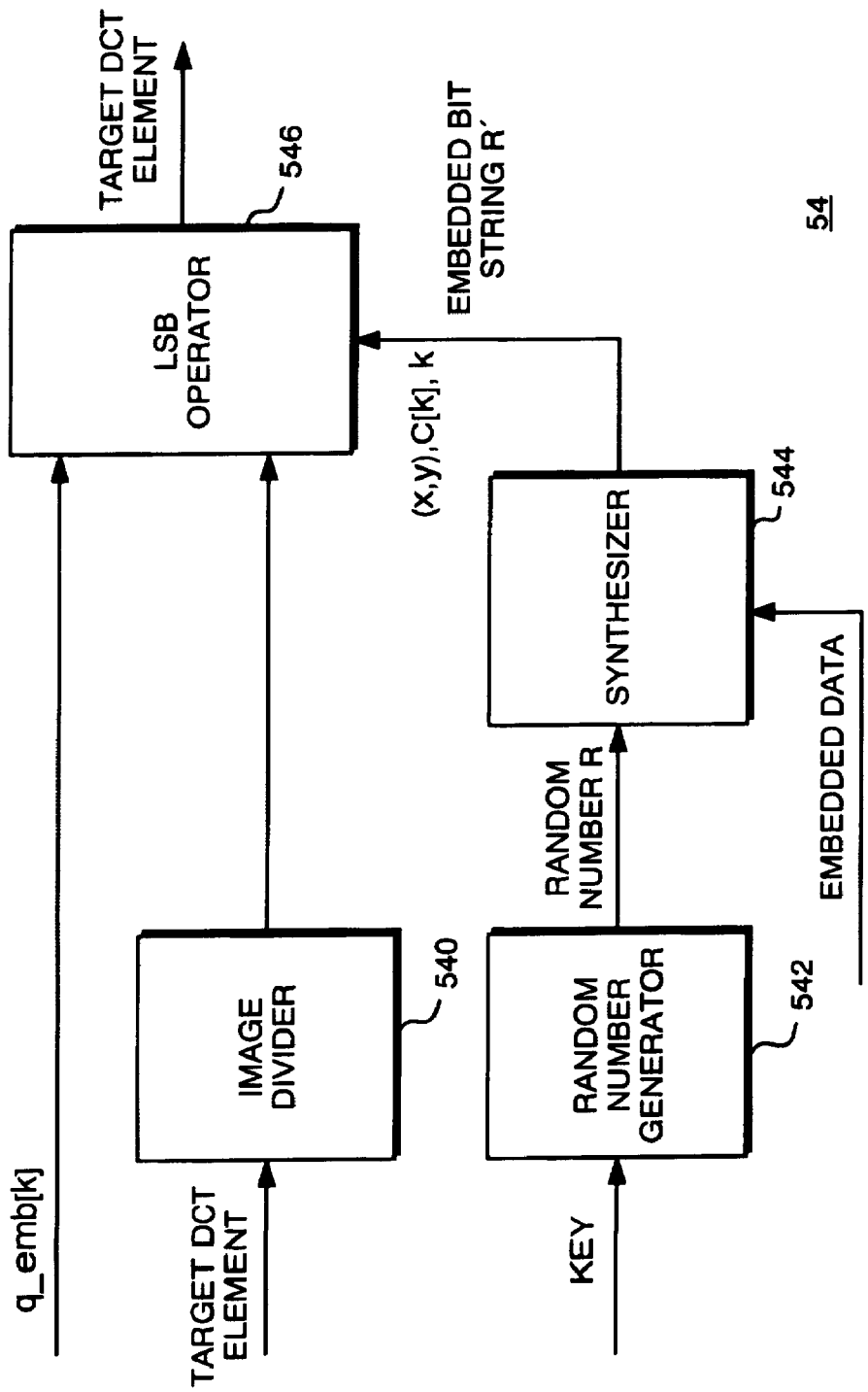
FIG. 15 is a diagram showing the arrangement of an alteration mark embedding portion in FIG. 13.

A modification of the image processing apparatus of the present invention will now be described. FIG. 13 is a diagram illustrating an embedding portion 50 that is used for the embedding portion 30 by the embedding/detection program 2 (FIG. 2). FIG. 14 is a diagram illustrating the arrangement of a pre-embedding processor 52 in FIG. 13. FIG. 15 is a diagram illustrating the arrangement of an alteration mark embedding portion 54 in FIG. 13.

Among the components of the embedding portion 50, an output format converter 502 corresponds to the output format converter 304 in the embedding portion 30 (FIG. 3). Among the components of the pre-embedding processor 520, a format identifier 520, a decoder 522, a BMP, YUV/JPEG' converter 524, a quantization value converter 526 and a quantization value calculator 526 respectively correspond to the format identifier 320, the decoder 322, the JPEG'/BMP converter 326, the YUV/BMP converter 328 and the embedded quantization value calculator 324 of the pre-embedding processor 32. The area A is not present in the embedding portion 50.

Pre-embedding Processor 52

The pre-embedding processor 52 extracts a DCT coefficient from an input image.

Alteration Mark Embedding Portion 54

The alteration mark embedding portion 54 embeds an alteration mark or data. Any embedding algorithm may be employed, and the LSB method can be used to prevent the deterioration of image quality.

Image Divider 540

An image divider 540 divides image data into blocks of 8×8 pixels each, and outputs input target DCT element 1, coefficient c[k] and an image location (x,y).

Random Number Generator 542

A random number generator 542 generates a random number R using a key K. The number of bits required for embedding is also required for the generation of the random number R, and for 720×480 pixels, 90×60 xn=5400n bits or more are required. While various methods are employed for the generation of the random number R, an LFSR of b=(int)(1+log25400n) bits can be employed to generate the random number R using equation 12, wherein K denotes a key, R0 denotes the initial value obtained from the key DB (or may denote a part of the key), and LFSRb denotes the LFSR calculation of the "b bit".

Equation 12

$$R = LFSRb(K, R0) \quad (12)$$

Synthesizer 544

Before embedding data in image data, a synthesizer 544 synthesizes image data and the random number R to create a bit string R' to be embedded. When the synthesizer 544 embeds an alteration mark, R'=R. To embed data, R', represented by equation 13, is a bit string to be embedded. In equation 13, ∧ means XOR, and "data" is 5400n bits of data that is to be embedded. When the data to be embedded is m bits, and m<5400n bits, the process performed to embed the data may be repeated m cycles times 5400n/m.

Equation 13

$$R' = R \wedge data \quad (13)$$

LSB Operation Portion 546

An LSB operation portion 546 employs R', q_emb[k], c[k], k and (x,y) to operate the LSB of the DCT coefficient belonging to {dct_coeffi}. First, the embedded bit emb_bit[k] satisfies equation 14, and to satisfy equation 10, all the DCT coefficients belonging to {dct coeffi} are processed for all the MCUs for which T[X] [Y]=0.

Equation 14

$$emb\_bit[k] = (R' >> (xn+90yn+1)) \& 1 \quad (14)$$

DCT Element Divider 528

A DCT element divider 528 receives the DCT coefficients (non-quantized) from the decoder 522 and the BMP, YUV/JPEG' converter 524, and separates them into the target DCT coefficient ({dct_coeffi}) and all others.

Quantization Value Calculator 526

The quantization value calculator 526 is the same as the embedded quantization value calculator 324, except that T[45] [60] is output in the initial state (T[X] [Y]=0 for all x, y).

Figure 16:
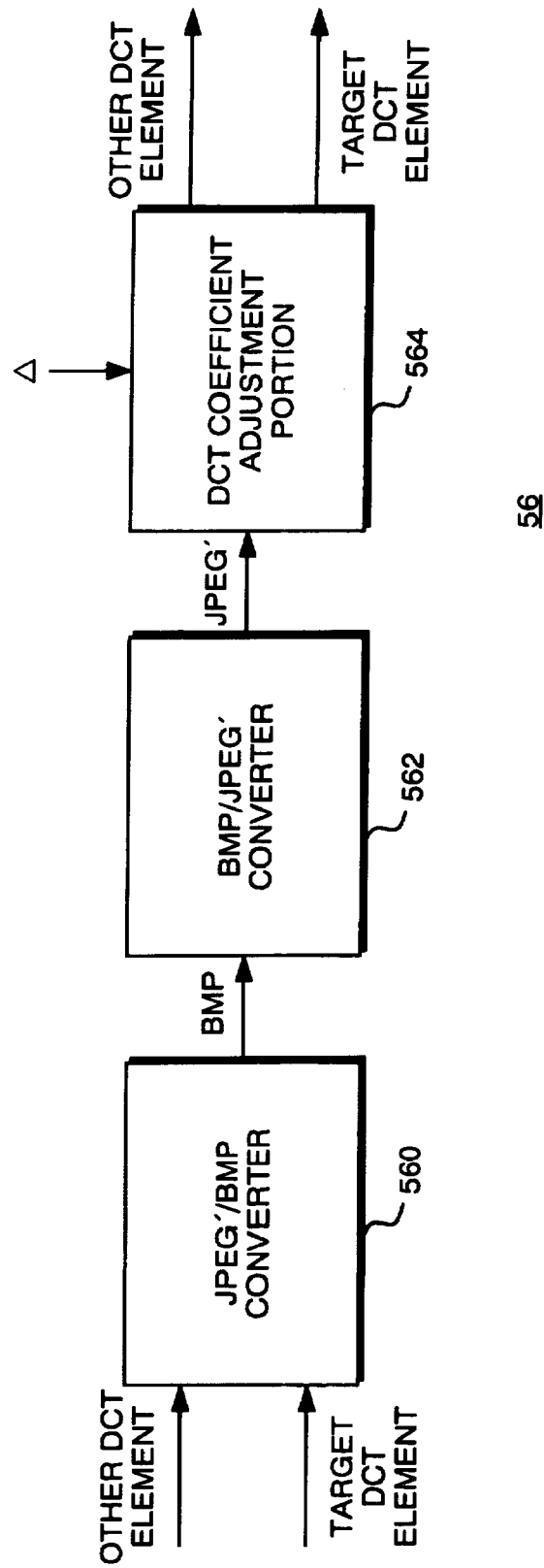
FIG. 16 is a diagram showing the arrangement of a post-embedding portion in FIG. 15.

FIG. 16 is a diagram illustrating the arrangement of a post-embedding processor 56 in FIG. 15. Among the components of the post-embedding processor 56, a DCT coefficient adjustment portion 564 is the same as the DCT coefficient adjustment portion 332 (FIG. 5) of the pre-embedding processor 32.

JPEG'/BMP Converter 560

A JPEG'/BMP converter 560 performs an iDCT transformation for the received JPEG' image, and converts the obtained image into a BMP format image through the performance of an overflow/underflow process.

BMP/JPEG' converter 562

Figure 17:
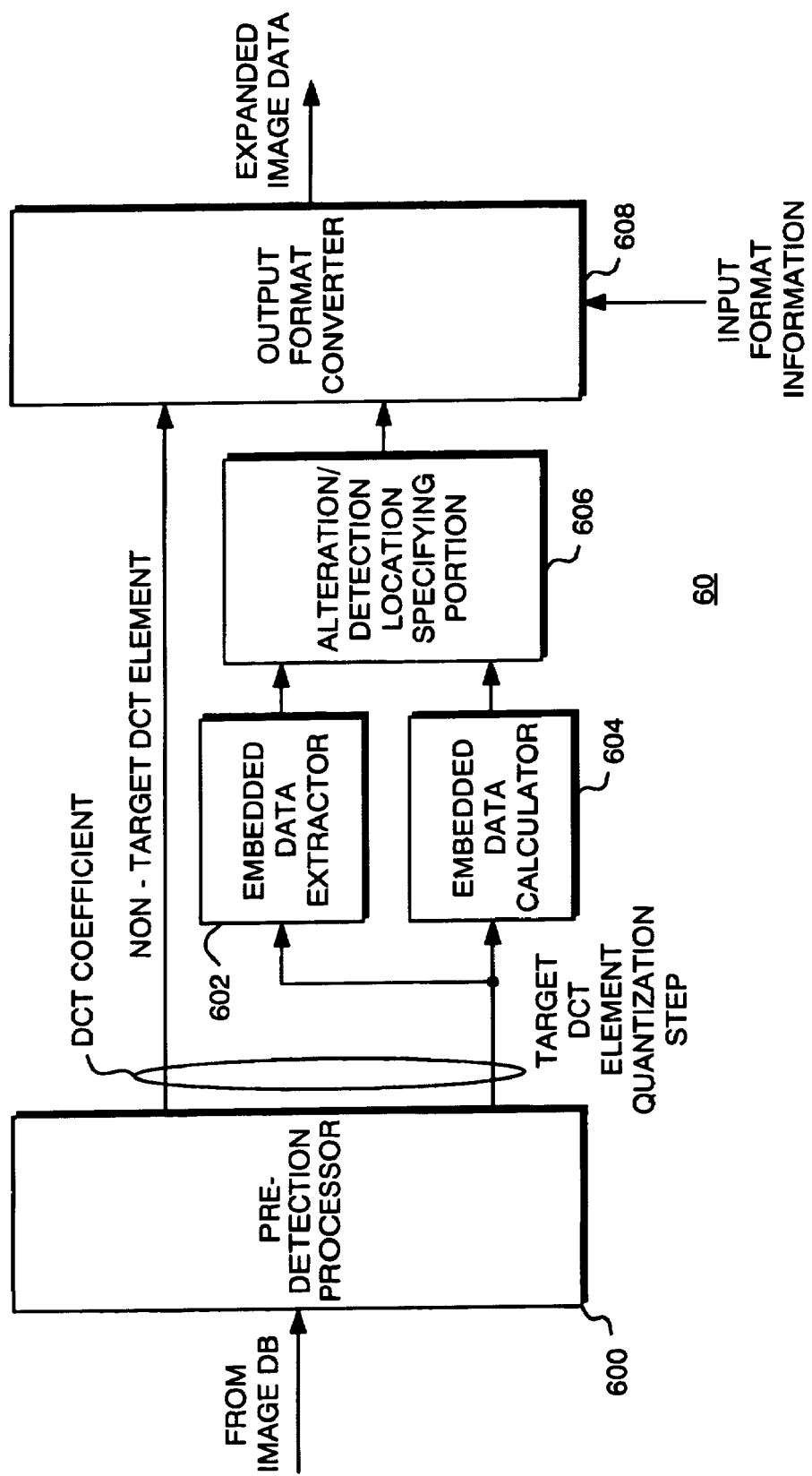
FIG. 17 is a diagram illustrating the arrangement of a second detector that is used by the embedding/detection program (FIG. 2)

A BMP/JPEG' converter 562 performs a DCT transformation for a received BMP image to obtain an image of the JPEG' format. FIG. 17 is a diagram showing the arrangement of a detector 60 that is used by the embedding/detection program 2 (FIG. 2) instead of the detector 40. When the image data embedded by the detector 40 in FIGS. 13 to 16 is an alteration mark, the detector 60 determines whether the image has been altered, and identifies an alteration location by using a block of 8×8 pixels. When there are n {dct coeffi} elements, the alteration detection rate for each block (intra-block) of 8×6 pixels is 1-2-n, and when n=4, as in this embodiment, the probability is 93.75%.

Pre-detection Processor 600

A pre-detection Processor 600 is the same as the pre-detection processor 42 in FIG. 7, with the exception that there is no embedding area A.

Embedded Data Extractor 602

An embedded data extractor 602 extracts the LSB of the DCT coefficient, which is a {dct_coeffi} element, and extracts embedded data. The intra-location (x,y) (0 ≦x<60, 0 ≦y <90), and the LSB for the n {dct_coeffi} elements are calculated by using equation 11, and the 5400n bits of extracted data, embed_data, wherein the intra-location obtained by equation 11 is the (xn+90yn+1)-th bit, are calculated.

Embedded Data Calculator 604

An embedded data calculator 604 calculates an embedded bit string R' in the same manner as do the random number generator 542 and the synthesizer 544 in FIG. 15.

Alteration Detection/Location Specifying Portion 606

An alteration detection/location specifying portion 606 employs embed_data and the bit string R' to determine whether an input image has been altered. If the image has been altered, the alteration location is specified. That is, when embed_data==R', the alteration detection/location specifying portion 606 determines there has been no alteration. In the other case (embed data<>R'), the specifying portion 606 finds all the bits having values that do not match. When, for example, the values do not match at the p-th bit (0 origin), the intra location (x,y), whereat the image data have been altered, can be specified using equation 15.

Equation 15

$$x = (int)(p/n) \bmod 90 \quad (15)$$
$$y = (int)(p/n/90)$$

Output Format Converter 608

An output format converter 608, in order that an alteration location can be identified, changes the image data received from the image DB 24 and outputs the resultant data.

Overall Operation

Figure 18:
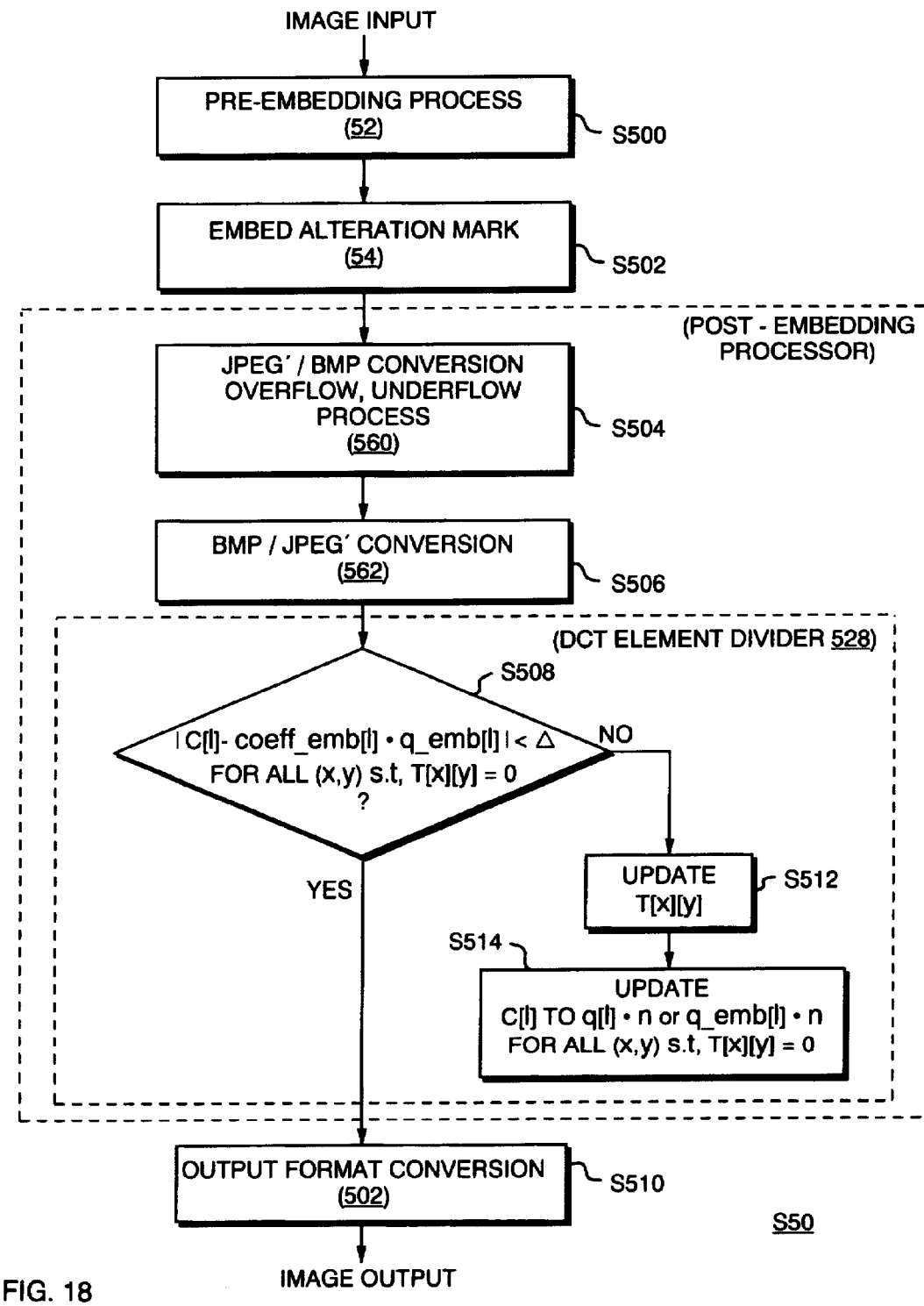
FIG. 18 is a first flowchart showing the processing performed by the detectors (FIGS. 13 to 17)
Figure 19:
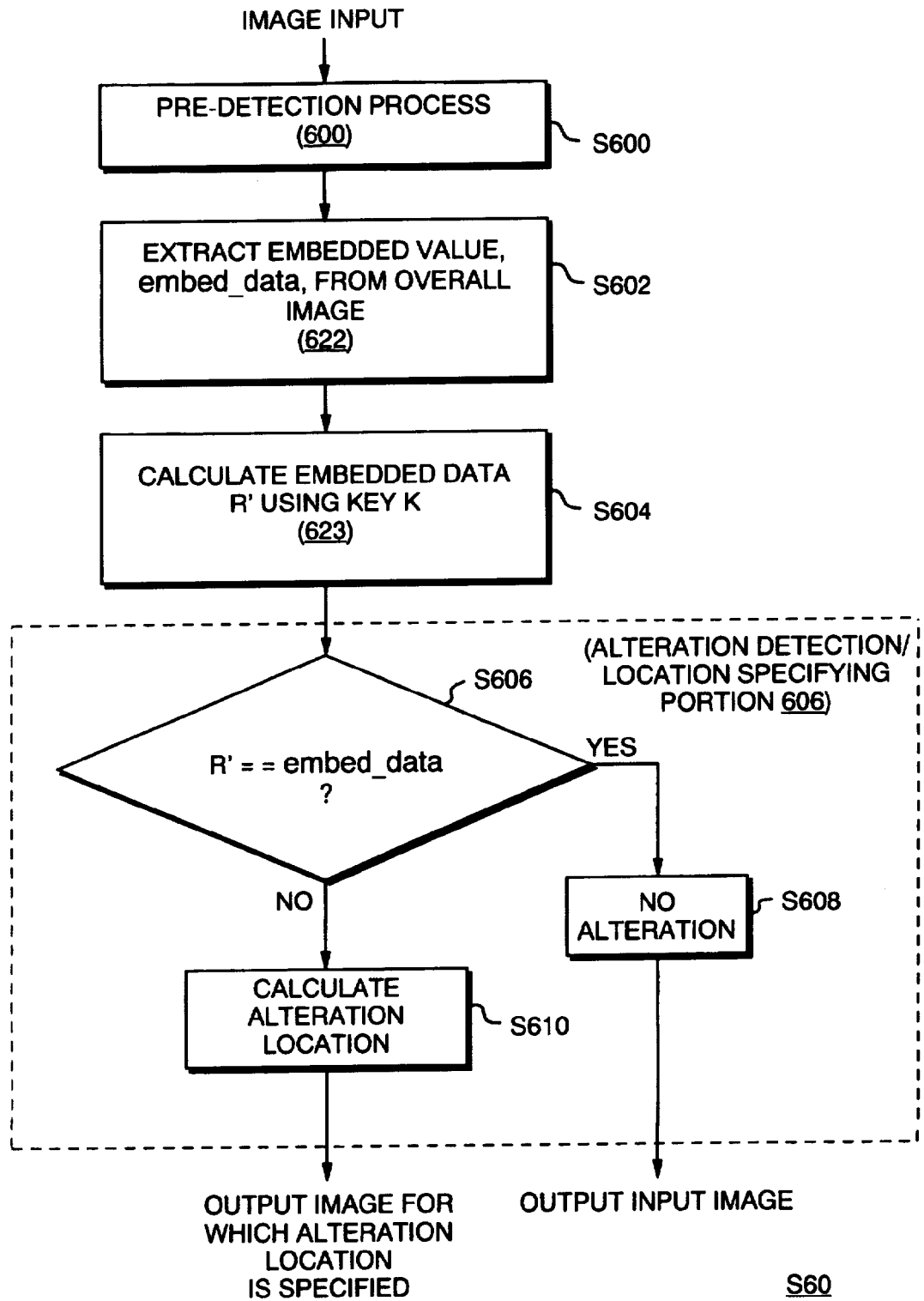
FIG. 19 is a second flowchart showing the processing performed by the detectors (FIGS. 13 to 17).

FIGS. 18 and 19 are flowcharts showing the processing performed by the detectors 40 and 60. The numbers in parentheses denote reference numerals provided for the components responsible for the processing. The detectors 40 and 60 perform the embedding processing shown in FIG. 18 and the detection processing shown in FIG. 19.

As is described above, according to the invention, the image processing apparatus and method are appropriate for the compression and the encoding of data. Specifically, according to the image processing apparatus and method of the invention, even when the quantization process is performed after verification information has been embedded in image data, the verification information is not lost.

Having thus described the invention, what is claimed is:

1. An image processing apparatus comprising:
   processor means for determining the quantization value for a predetermined process to be performed on image data;
   conversion means for altering values of image data so that quantized values, arrived at by quantization of said image data after performing said predetermined process, will not be changed by errors introduced through said predetermined process;
   processing means for performing said predetermined process for said image data; and
   quantization means for quantizing said image data for which said predetermined process has been performed.

2. The image processing apparatus according to claim 1, wherein said processing means divides said image data to perform an embedding process which embeds embedding data into each of divided image data, said apparatus further comprising detection means for detecting said data being embedded in said divided image data.

3. The image processing apparatus according to claim 1, wherein said conversion means comprises:
   format conversion means for changing the form of each pixel included in said image data; and
   adjustment means for, based on a quantization value used for said quantization, adjusting said value of said image data whose form has been changed,
   wherein the form changing process and the adjustment process are repeated until, for each set of said image data whose form has been changed, quantized values do not change by errors that are introduced through said predetermined process.

4. The image processing apparatus according to claim 1, wherein said processing means performs, as said predetermined process, a process for embedding data in said image data.

5. The image processing apparatus according to claim 4, wherein said processing means comprises:
   a hash value calculation means for calculating a hash value based on predetermined key information and said image data; and embedding means for embedding said hash value in said image data.

6. The image processing apparatus according to claim 5 further comprising detection means for detecting said data that are embedded in said image data.

7. The image processing apparatus according to claim 5, further comprising:
inverse quantization means for inversely quantizing image data;
extraction means for extracting a hash value that is embedded in said inversely quantized image data;
calculation means for calculating a hash value based on said image data and said key information that are used for the calculation of said hash value that is extracted; and
alteration detection means for employing said hash value that is extracted and said hash value that is calculated to determine whether said inversely quantized image data have been altered.

8. The image processing apparatus according to claim 4 further comprising detection means for detecting said data that are embedded in said image data.

9. An image processing method comprising the steps of:
determining the quantization value for a predetermined process to be performed on image data;
altering the values of image data so that quantized values, arrived at by quantization of said image data after performing said predetermined process, will not be changed by errors that are introduced through said predetermined process;
performing said predetermined process for said image data; and
quantizing said image data for which said predetermined process has been performed.

10. The method according to claim 9, wherein, at said performing said predetermined process, an embedding process is performed and said image data to perform an embedding process which embeds embedding data into each of divided image data, said method further comprising a detection step for detecting said data being embedded in said divided image data.

11. The method according to claim 9, wherein said altering comprises:
a format conversion step of changing the form of each pixel included in said image data; and
an adjustment step of, based on a quantization value used for said quantization, adjusting said value of said image data whose form has been changed,
wherein the form changing process and the adjustment process are repeated until, for each set of said image data whose form has been changed, quantized values are not changed by errors that are introduced through said predetermined process.

12. The method according to claim 9, wherein a process for embedding data in said image data is performed as said predetermined process.

13. The method according to claim 12, wherein said processing step comprises:
a hash value calculation step, of calculating a hash value based on predetermined key information and said image data; and an embedding step, of embedding said hash value in said image data.

14. The method according to claim 13, wherein said program further comprises: a detection step, of detecting said data that are embedded in said image data.

15. The method according to claim 13, further comprising:
an inverse quantization step, of inversely quantizing image data;
an extraction step, of extracting a hash value that is embedded in said inversely quantized image data;
a calculation step, of calculating a hash value based on said image data and said key information that are used for the calculation of said hash value that is extracted; and
an alteration detection step, of employing said hash value that is extracted and said hash value that is calculated to determine whether said inversely quantized image data have been altered.

16. The method according to claim 12, further comprising a detection step, of detecting said data that are embedded in said image data.

17. A computer readable storage medium in which a program is stored that enables a computer to perform the method steps of:
a determining step, for determining the quantization value for a predetermined process to be performed on image data;
a conversion step, for altering the values of image data so that quantized values, arrived at by quantization of said image data after performing said predetermined process, will not be changed by errors that are introduced through said predetermined process;
a processing step for performing said predetermined process for said image data; and
a quantization step, for quantizing said image data following the performance of said predetermined process.

18. The storage medium according to claim 17, wherein, at said processing step, an embedding process is performed and said image data to perform an embedding process which embeds embedding data into each of divided image data and a detection step is further included for detecting said data being embedded in said divided image data.

19. The storage medium according to claim 17, wherein said conversion step comprises:
a format conversion step of changing the form of each pixel included in said image data; and
an adjustment step of, based on a quantization value used for said quantization, adjusting said value of said image data whose form has been changed,
wherein the form changing process and the adjustment process are repeated until, for each set of said image data whose form has been changed, quantized values are not changed by errors that are introduced through said predetermined process.

20. The storage medium according to claim 17, wherein, at said processing step, a process for embedding data in said image data is performed as said predetermined process.

21. The storage medium according to claim 20, wherein said processing step comprises:
a hash value calculation step, of calculating a hash value based on predetermined key information and said image data; and an embedding step, of embedding said hash value in said image data.

22. The storage medium according to claim 21, wherein said program further comprises: a detection step, of detecting said data that are embedded in said image data.

23. The storage medium according to claim 21, wherein said program further comprises:
- an inverse quantization step, of inversely quantizing image data; an extraction step, of extracting a hash value that is embedded in said inversely quantized image data;
- a calculation step, of calculating a hash value based on said image data and said key information that are used for the calculation of said hash value that is extracted; and
- an alteration detection step, of employing said hash value that is extracted and said hash value that is calculated to determine whether said inversely quantized image data have been altered.

24. The storage medium according to claim 20, wherein said program further comprises: a detection step, of detecting said data that are embedded in said image data.

* * * * *